(12) United States Patent
Fumarolo et al.

(10) Patent No.: US 6,204,844 B1
(45) Date of Patent: Mar. 20, 2001

(54) METHOD AND APPARATUS FOR DYNAMICALLY GROUPING COMMUNICATION UNITS IN A COMMUNICATION SYSTEM

(75) Inventors: Arthur L. Fumarolo, Schaumburg; Brett A. Jackson, Arlington Heights, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/415,298

(22) Filed: Oct. 8, 1999

(51) Int. Cl.[7] ................................................. G09F 13/00
(52) U.S. Cl. ............................................. 345/329; 345/349
(58) Field of Search .................................. 345/352–355, 345/356–357, 329–330, 331, 332, 340, 348–349, 326, 333; 707/9, 10; 709/201, 205

(56) References Cited

U.S. PATENT DOCUMENTS

| 5,613,209 | * | 3/1997 | Peterson et al. ................... 455/34.1 |
| 5,836,529 | * | 11/1998 | Gibbs ................................. 246/122 |
| 5,884,035 | * | 3/1999 | Butman et al. ................. 395/200.48 |
| 5,909,217 | * | 6/1999 | Bereiter ............................... 345/357 |
| 5,966,443 | * | 10/1999 | Gonzalez et al. ..................... 380/21 |
| 5,966,659 | * | 10/1999 | McDonald et al. ................. 455/445 |
| 6,016,478 | * | 1/2000 | Zhang et al. ............................ 705/9 |
| 6,072,490 | * | 6/2000 | Bates et al. .......................... 345/347 |
| 6,105,027 | * | 8/2000 | Schneider et al. ..................... 707/9 |

* cited by examiner

Primary Examiner—Steven Sax
(74) Attorney, Agent, or Firm—Val Jean Hillman

(57) ABSTRACT

A display-based terminal (101) employs a method and apparatus for dynamically grouping communication units (105–113) operating in a communication system (100). The display-based terminal displays a map (300, 400) to a user of the terminal that indicates, among other things, locations of communication units in at least a portion of the communication system. The terminal receives the user's selection of communication units from the map and an identification of at least one talkgroup with which the selected units are to become members. The communication units may be selected individually, as a group (e.g., using "click and drag" rectangling techniques), or both. After communication units have been selected from the map, the terminal automatically groups the selected units into the indicated talkgroup. If the terminal user desires to ungroup a previously grouped communication unit, the user selects the unit from the map and the terminal automatically removes the newly selected unit from the talkgroup.

31 Claims, 12 Drawing Sheets

METHOD AND APPARATUS FOR DYNAMICALLY GROUPING COMMUNICATION UNITS IN A COMMUNICATION SYSTEM

FIELD OF THE INVENTION

The present invention relates generally to communication systems and, in particular to, dynamically grouping communication units in a communication system from a display-based terminal.

BACKGROUND OF THE INVENTION

Dispatch communication systems are known to include a wireless infrastructure and a plurality of communication units, such as two-way radios. Some dispatch systems, such as those used for public safety, also include a dispatch console and a so-called "computer aided dispatch (CAD) system" that includes a display-based terminal to control communications between the communication units. The CAD terminal typically displays categorized tables of information to the terminal user (typically referred to as a "dispatcher" or "dispatch operator"). For example, the CAD terminal may display queues of currently pending incidents and/or a list of communication units that are currently available. In addition, some CAD terminals include an integrated mapping program that enables the CAD terminal to display locations of communication units on a map that represents a geographic area supported by the dispatch system. The locations of the communication units are typically provided to the CAD system on a periodic basis by an automatic vehicle location (AVL) system that is coupled to the CAD system via a dedicated communication link.

In addition to receiving communication unit location information, the CAD system may also receive incident information from a 911 system that is coupled to the CAD system. In such a case, the map displays the origination point of a 911 telephone call to the dispatcher as an icon on the map. By viewing communication unit location, communication unit status, and incident location on the map, the dispatcher can quickly determine which communication unit users (e.g., policemen, firemen, paramedics, and so forth) would be in the best situation to respond to the incident. As an incident is attended to by users of the communication units, the status of the communication units associated with such users is updated either manually by the dispatcher or automatically by the CAD system responsive to messaging from the wireless infrastructure. In the latter case, the wireless infrastructure receives status updates over a wireless communication channel from the communication units that are participating in the handling of the incident. Changes in communication unit status are typically indicated to the dispatcher by some type of visual change, such as a color change or icon update, to the participating unit's representation on the map.

A map display, with icons representing the incidents and the communication units with their current status, gives a dispatcher a powerful tool for quickly evaluating an emergency situation. By using standard graphical user interface (GUI) cursor interaction (e.g., "point and click" or "drag and drop"), the dispatcher can manipulate the screen icons to assign units to incidents. In some systems, the action of assigning communication units to incidents on the map automatically sends data to the assigned communication units (e.g., if the units are equipped with mobile data terminals) to enable the communication unit users to immediately obtain critical information related to the incident, such as the incident location and other details.

In many situations, the communication units assigned to handle an incident belong to different agencies, such as police, fire, ambulance, public works, and so forth. The communication units are, however, generally programmed to permit direct group communications only with other communication units from the same agency, and are not programmed to facilitate direct group communications between communication units of different agencies. To permit such inter-agency communications, dispatch systems generally provide for dynamic regrouping of communication units into a common talkgroup, thereby enabling direct group communications between regrouped units. Dynamic regrouping is typically performed by a radio management program in the dispatch console or by a CAD program that interacts with the dispatch console via a defined interface, such as an application programming interface.

In the case of a large emergency incident, many communication units may arrive at and leave the scene of the emergency during the course of the emergency. Therefore, grouping and ungrouping of the units attending to the emergency is very important to enable the attending units to directly communicate while at the scene, but enable the units to communicate in their original talkgroups (e.g., with other units of their particular agency) after leaving the scene. In existing dispatch systems, the dispatcher or another individual, such as an emergency response supervisor, must manually group and ungroup units as they arrive at and leave the scene of the emergency incident using the aforementioned radio management or CAD program. The CAD or radio management dynamic grouping program can be run from or displayed on the CAD terminal; however, such programs require the dispatcher to leave the map environment to execute them, thereby losing the benefit of having a map display to view the system and, in particular, the geographic area near the emergency incident in the first place.

Therefore, a need exists for a method and apparatus that allows a user of a display-based terminal, such as a CAD terminal, having an integrated mapping program to dynamically group and ungroup communication units from a single map environment.

DETAILED DESCRIPTION OF A PREFERRED EMBODIMENT

Generally, the present invention encompasses a method and apparatus for dynamically grouping communication units in a communication system. A display-based terminal displays a map to a user of the terminal, wherein the map indicates locations of communication units in at least a portion of the communication system. The terminal receives the user's selection of at least one communication unit from the map and an identification of at least one talkgroup with which the selected communication unit or units are to become members. The selection of communication units may be made by selecting the communication units individually, by selecting the communication units as a group (e.g., using "click and drag" or "drag and drop" rectangling techniques), by selecting one or more geographic areas or regions on the map and thereby indirectly selecting communications units that are presently in or that enter the areas or regions, or by some combination of such selection techniques.

After communication units have been selected for grouping, the terminal automatically groups the selected communication units into the indicated talkgroup or talkgroups. If, at some later time, the terminal user desires to ungroup the previously grouped communication units, the user selects the units to be ungrouped using any one or more of the above selection techniques and, upon such selection, the terminal automatically ungroups the newly selected units. The terminal user may further establish criteria for grouping and ungrouping communication units. For example, the terminal user may specify certain individual communication units that will remain dynamically grouped even if such communication units leave the geographic area used to indirectly select communication units for regrouping.

By grouping and ungrouping communication units in this manner, the present invention incorporates the terminal user's ability to dynamically regroup communication units directly into the map display, in contrast to prior art computer-aided dispatch (CAD) regrouping approaches that require the user to first determine from the map which communication units to regroup or ungroup and then use a separate regrouping program to actually select the units to be grouped or ungrouped and perform the regrouping. The present invention links the regrouping functionality directly into the map display to enable the terminal user to simply "point and click", "click and drag", or the equivalent to quickly regroup communication units being monitored by the terminal user as such regrouping may be necessary to accomplish system-related tasks, such as responding to emergency incidents.

Figure 1:
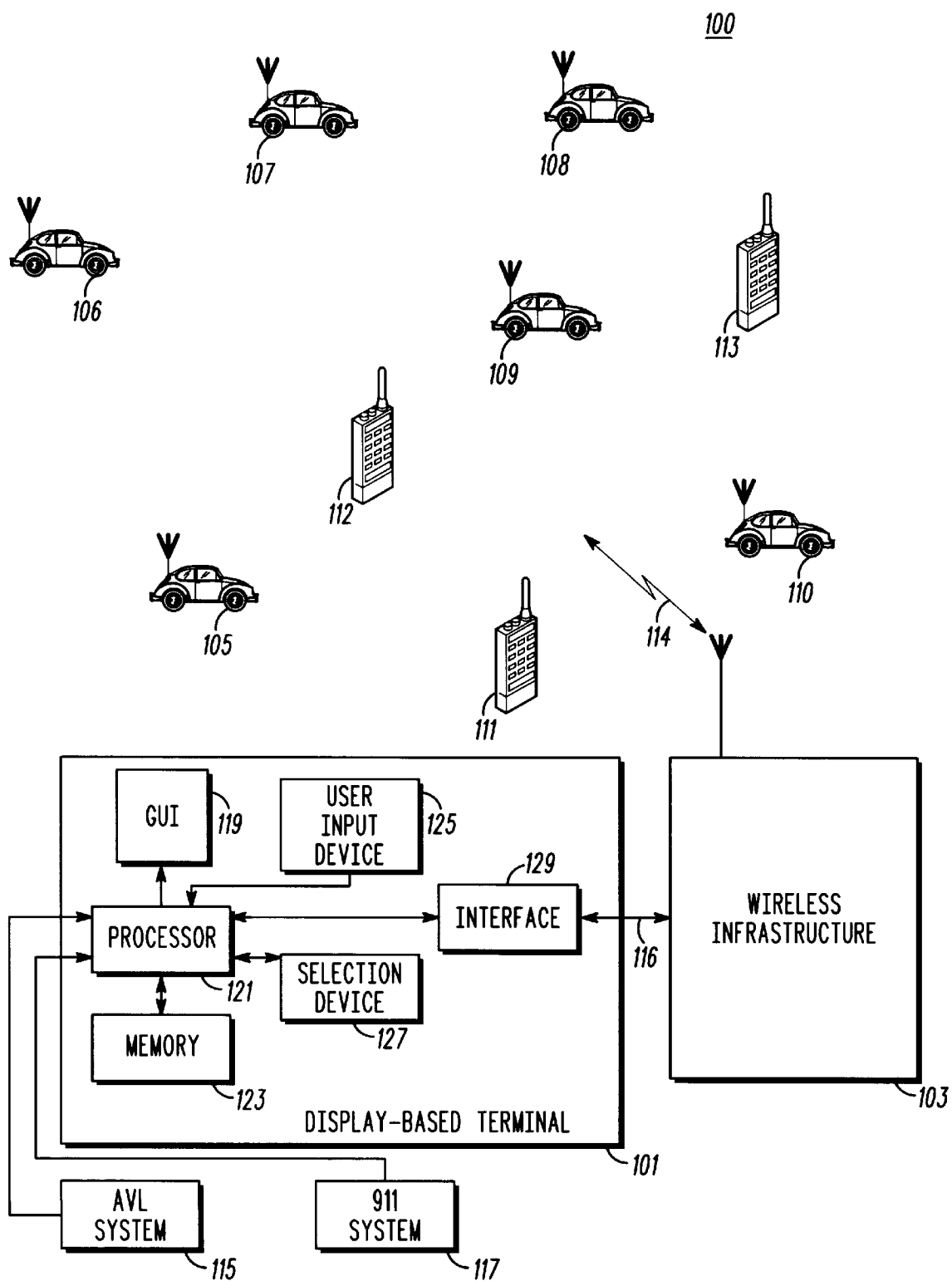
FIG. 1 illustrates a block diagram of a communication system in accordance with a preferred embodiment of the present invention.

The present invention can be more fully understood with reference to FIGS. 1–12, in which like reference numerals designate like items. FIG. 1 illustrates a block diagram of a communication system 100 in accordance with a preferred embodiment of the present invention. The communication system 100 includes a display-based terminal 101, a wireless infrastructure 103, which contains memory, and a plurality of communication units 105–113 that communicate with the wireless infrastructure 103 over one or more communication resources 114 (one shown). The communication system 100 may be either a conventional system or a trunked system and each communication resource 114 may comprise a frequency carrier, one or more time slots of a frequency carrier, or an orthogonal code implemented by a respective frequency hopping pattern or by a pseudo-random noise sequence spread over a wide (e.g., 3 MHz) bandwidth.

The communication units 105–113 comprise two-way mobile radios, two-way portable radios, or two-way wireless data terminals. As depicted in FIG. 1, the communication units 105–113 preferably comprise a combination of mobile radios, portable radios, and wireless data terminals. The wireless infrastructure 103 supports the particular communication system 100 and, therefore, comprises one or more base stations (e.g., in a conventional system) or one or more base stations and one or more system controllers (e.g., in a trunking system). The wireless infrastructure 103 is coupled to the display-based terminal 101 via one or more communication links 116 (one shown), such as broadband leased telephone lines (e.g., T1 or T3 lines), standard telephone lines, coaxial cable, fiber optic cable, or microwave links when the terminal 101 is located a substantial distance from the wireless infrastructure 103 or an RS232 cable or standard telephone lines when the terminal 101 is collocated with the wireless infrastructure 103.

In the preferred embodiment, the display-based terminal 101 is a fixed computer-aided dispatch (CAD) terminal that is coupled to an automated vehicle location (AVL) system 115 and an emergency 911 system 117. The AVL system 115 and the 911 system 117 are well known; thus, no further discussion of them will be presented except to facilitate an understanding of the present invention. The display-based terminal 101 preferably includes a graphical user interface (GUI) 119, a processor 121, a memory 123, a user input device 125, a selection device 127, and an interface 129 to the wireless infrastructure 103. The interface 129 corresponds to the particular type of communication link 116 between the terminal 101 and the wireless infrastructure 103 and may comprise a radio frequency (RF) modem or a wireline modem to couple the processor 121 to the wireless infrastructure 103.

The GUI 119 is well known and, responsive to the processor 121, presents the user of the terminal 101 with a map display of locations of communication units 105–113 in at least a portion of the communication system 100. The processor 121 preferably comprises a microprocessor and a digital signal processor for controlling the various elements of the terminal 101 and for communicating with the wireless infrastructure 103. The user input device 125 preferably comprises a foot switch, a panel microphone, a push-to-talk (PTT) activator, a computer mouse, a keyboard, a touchscreen portion of the GUI 119, a voice activated device, a voice recognition device, or some combination thereof to enable the user of the terminal 101 to input user information for transmission to one or more of the communication units 105–113. The memory 123 preferably comprises a combination of random access memory (RAM), read only memory (ROM), programmable read only memory (PROM), and a floppy disk to store software algorithms and data used by the processor 121 during operation of the terminal 101. Finally, the selection device 127 preferably comprises a computer mouse or equivalent (e.g., trackball or touchpad), a keyboard, a touchscreen portion of the GUI 119, a voice recognition device, a voice activated device or some combination thereof to enable the user of the terminal 101 to make selections from the map displayed on the GUI 119.

Figure 2:
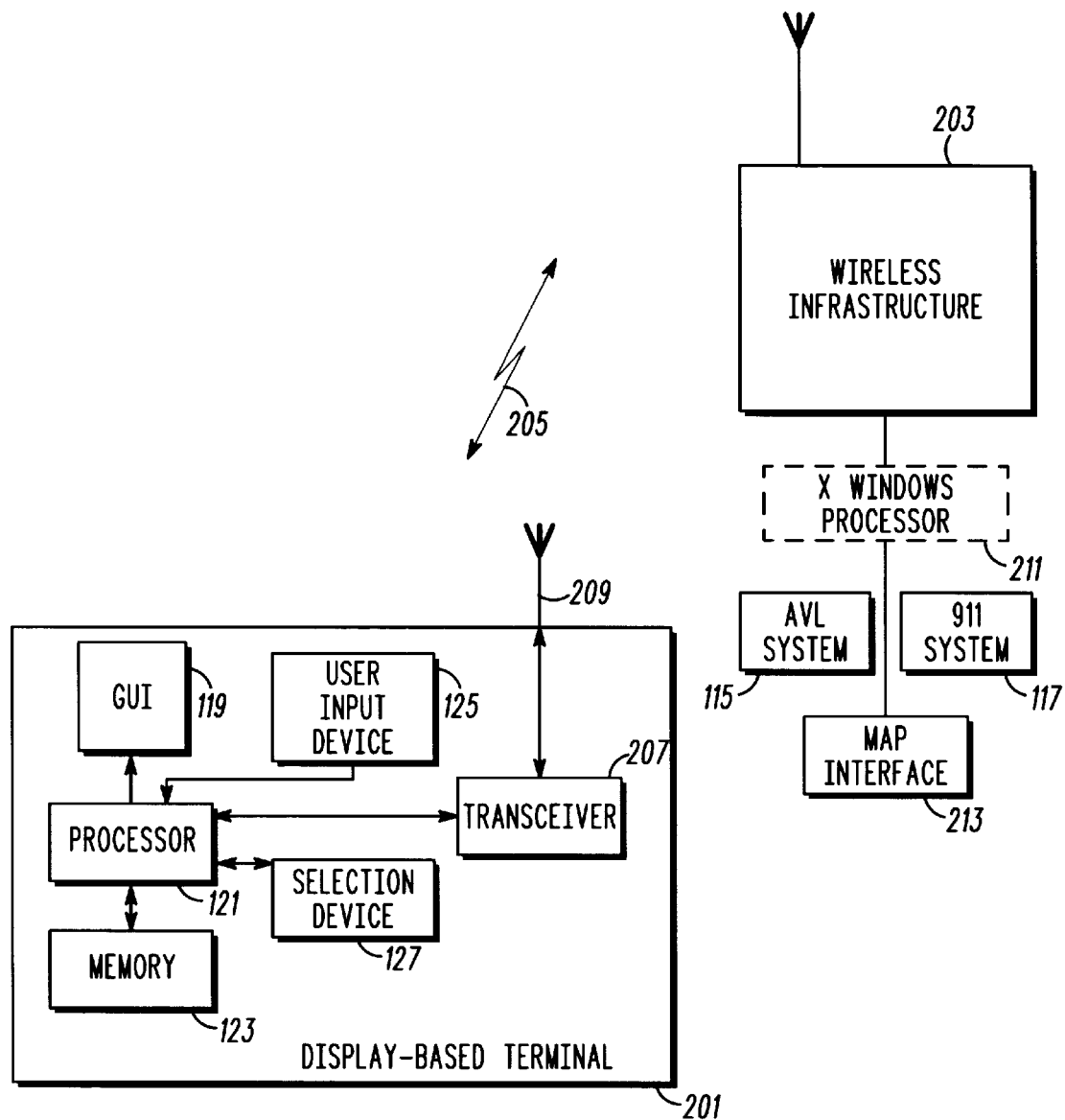
FIG. 2 illustrates a block diagram of a communication system, less communication units, in accordance with an alternative embodiment of the present invention.

In an alternative embodiment, as depicted in FIG. 2, the display-based terminal 201 is a remote terminal (e.g., a mobile dispatch or dummy terminal positioned in the geographic area of an emergency) that is not coupled directly to the AVL system 115 and the 911 system 117. In this embodiment, the display-based terminal 201 includes a radio transceiver 207 coupled to the processor 121 and an antenna 209 coupled to the radio transceiver 207 to enable the terminal 201 to exchange information with the wireless infrastructure 203 via an RF channel 205. In addition, in this embodiment, the AVL system 115, the 911 system 117, and a map interface 213 are coupled to the wireless infrastructure 203 either directly or indirectly, for example, via a processor, such as an X Windows processor 211 (shown in dash). In this embodiment, the terminal 201 receives communication unit location updates from the AVL system 115 and emergency incident locations from the 911 system 117 via the wireless infrastructure 203 over the RF channel 205.

Figure 3:
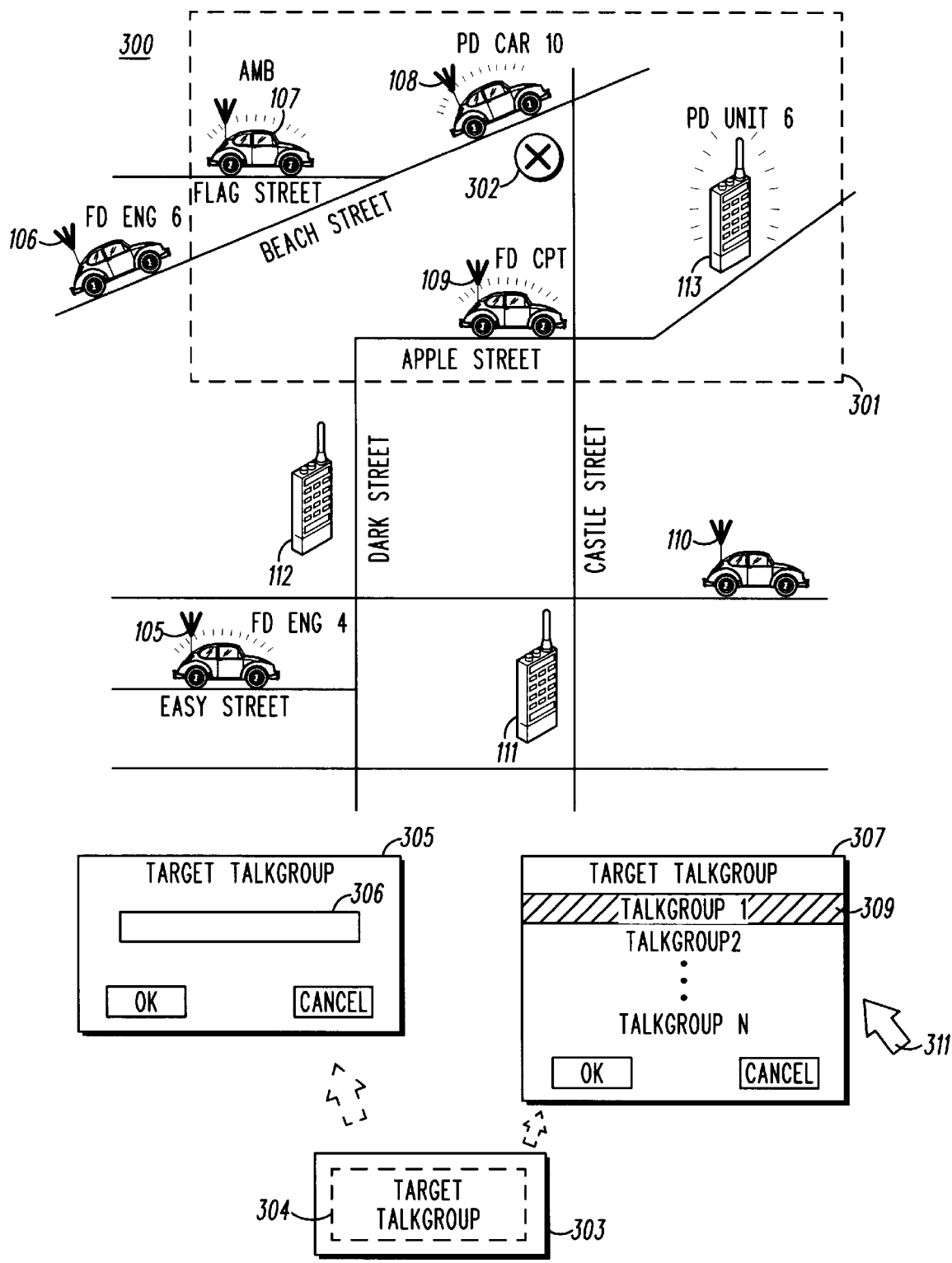
FIG. 3 illustrates an exemplary map displayed to a user of a display-based terminal in accordance with the present invention.
Figure 4:
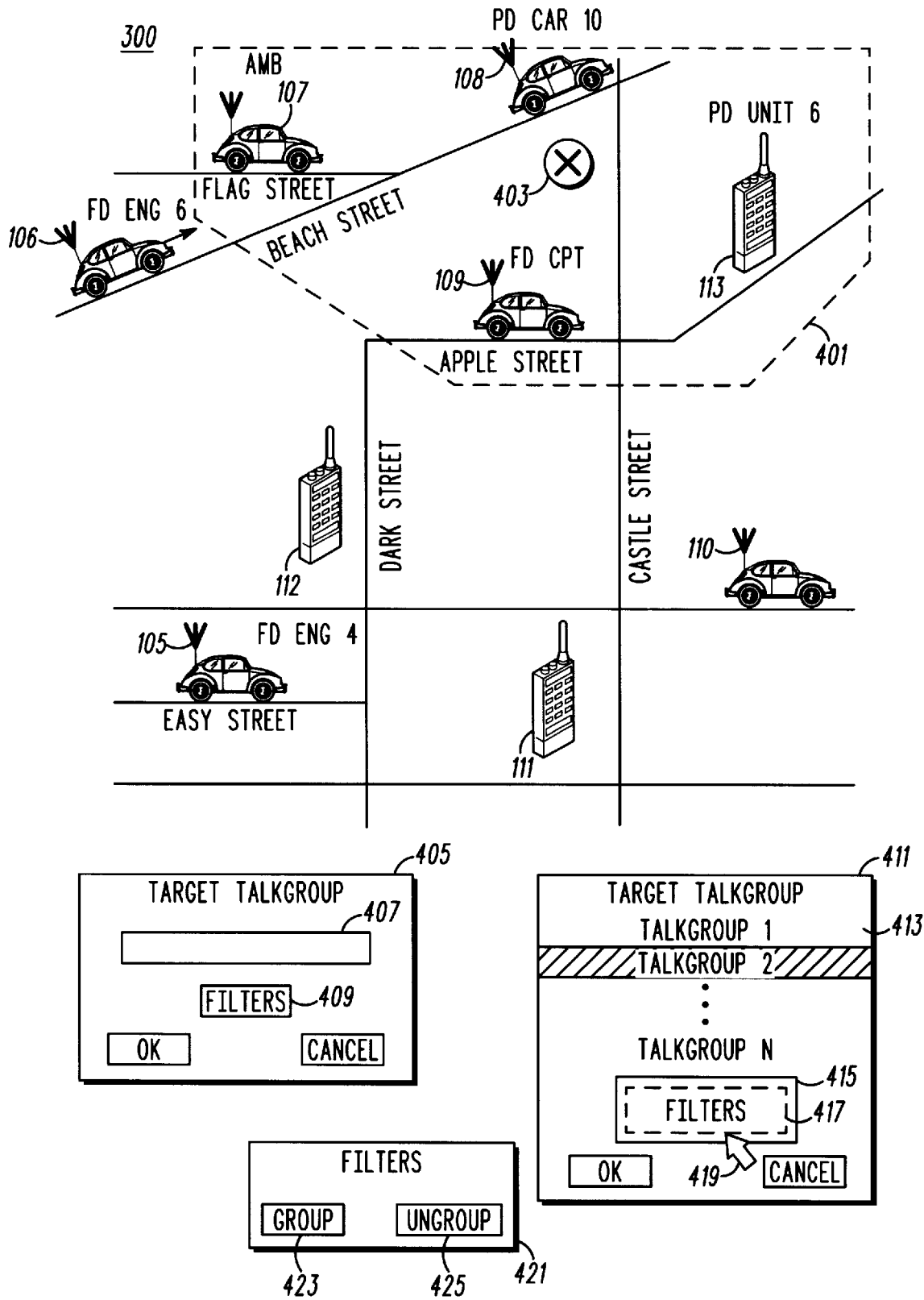
FIG. 4 illustrates an alternative exemplary map displayed to a user of a display-based terminal in accordance with the present invention.

FIGS. 3 and 4 illustrate exemplary maps 300, 400 displayed to a user of the display-based terminal 101, 201 in accordance with the present invention. As shown in both FIGS., the map 300, 400 preferably depicts representations of the communication units 105–113 positioned on and off streets in a geographic area of the communication system 100. In addition, the map 300,400 also preferably displays the identities of the users of the communication units 105–113 (e.g., Fire Department Engine 4 ("FD ENG 4"), Fire Department Captain ("FD CPT"), Police Department Car 10 ("PD CAR 10"), Police Department Unit 6 ("PD UNIT 6"), Fire Department Engine 6 ("FD ENG 6"), Police Department Captain ("PD CPT"), and Ambulance ("AMB")) and the names of the streets. Only some exemplary street names and communication unit user identities are shown in FIGS. 3 and 4 for the sake of clarity. The map 300, 400 may further indicate (e.g., below the representation of the respective communication unit 105–113 or through the use of a color coding scheme for each communication unit representation) the status of each communication unit 105–113 (e.g., active, inactive, off-duty, busy, assigned to an incident, and so forth). In addition, the map 300, 400 preferably displays the location of an incident 302, 403 which some of the communication units may be responding to if, for example, the communication system 100 is a city's or a county's emergency response system.

Besides depicting the locations of the communication units 105–113, the location of an incident 302, and various information about the communication units 105–113 or their users, the map 300, 400 also preferably displays one or more of various means for the user of the display-based terminal 101, 201 to select a talkgroup for dynamically regrouping at least some of the communication units 105–113. For example, the map 300, 400 may include a virtual button 303 that, when depressed or selected (as indicated by dashed box 304) by placement of a cursor 311, 419 on top of a portion of the button 303 preferably using a computer mouse and depressing or "clicking" a physical button on the mouse, opens a window 305, 405 containing an entry field 306, 407 in which the terminal user may enter the identification of a target talkgroup to be formed upon the dynamic regrouping. The window 305, 405 may further include "OK" and "CANCEL" buttons as shown to enable the user to confirm or cancel his or her entry and preferably close the window 305, 405.

Additionally or alternatively, depression or selection of the virtual button 303 may open a window 307, 411 that includes a list of possible target talkgroups from which the user may use the cursor 311, 419 under the control of a computer mouse, a keyboard, a voice recognition device or some other selection device 127 to select an identification of a talkgroup to be formed upon the dynamic regrouping. In such a case, depression of the virtual button 303 functions as a request to the terminal 101, 201 to retrieve a list of talkgroup identifications stored in the terminal's memory 123, in response to which, the terminal 101, 201 retrieves the list and displays it in the window 307, 411. Alternatively, the list of talkgroup identifications may be stored in and retrieved from memory within the wireless infrastructure 103. Selection of a talkgroup identification from the list may be indicated by highlighting the selected talkgroup identification 309, 413 as depicted in FIGS. 3 and 4, by changing the color of the text of the selected talkgroup identification 309, 413, or by any other means. This window 307, 411 may also include "OK" and "CANCEL" buttons as shown to enable the user to confirm or cancel his or her selection and preferably close the window 307, 411.

Besides providing means for enabling the terminal user to select one or more talkgroups for the regrouping, the terminal 101, 201 may also include means for the terminal user to enter or select criteria to limit which communication units are to be affected by the regrouping and how they are to be affected. For example, as depicted in FIG. 4, the map 300, 400 may include a virtual button 409, 415 from which the user of the terminal 101, 201 can select filters to be checked and applied during the regrouping process. Thus, when the terminal user clicks on or otherwise selects button 415 (as indicated by dashed box 417), a window 421 preferably appears on the display that lists various criteria or that may include additional buttons 423, 425 to enable the terminal user to further select the application of the criteria (e.g., grouping-related or ungrouping-related). For instance, selection of the "GROUP" button 423 indicates to the terminal 101, 201 that the subsequently entered or selected criteria applies to the communication units as they are being regrouped. By contrast, selection of the "UNGROUP" button 425 indicates to the terminal 101, 201 that the subsequently entered or selected criteria applies to the communication units as they are being ungrouped after a regrouping. Selection of either the GROUP button 423 or the UNGROUP button 425 preferably opens another window (not shown) that is either similar to window 305, 405 in that it includes an entry field for entering filtering criteria or is similar to window 307, 411 in that it includes a list of filtering criteria. Similar types of criteria may be used in the grouping and ungrouping filters. Such criteria includes, but is not limited to, talkgroup identifications, individual communication unit identifications or aliases, and communication unit statuses.

Although the above discussion of the means for selecting or identifying talkgroups and filter criteria focused primarily on virtual buttons that, when selected, opened various windows, the map 300, 400 may instead or in addition include one or more pull-down menus that include the list of talkgroups and/or the list of filtering criteria. Therefore, the terminal user may simply select an appropriately-labeled pull-down menu (e.g., at the top of the map 300, 400) to obtain entry windows, such as windows 305 and 405, or lists, such as lists 307 and 411.

To select a communication unit or communication units 105–113 to be dynamically regrouped, the user has a variety of options. For example, the user may use a computer mouse to move the cursor 311, 419 on top of a communication unit representation (e.g., the representation of communication unit 105) and depress or click a physical button on the mouse to indicate a selection. To select multiple communication units for regrouping, the terminal user may individually select the displayed representation of each affected communication unit using such a "point-and-click" technique or the user may use a "click and drag" approach to select a group of communication units simultaneously. For example, as depicted in FIG. 3, the user may move the cursor 311 to a corner of an area of the map 300, depress the mouse button, and, while holding the mouse button depressed, drag the cursor 311 to an opposite corner of the desired area to display a rectangle 301, such that when the mouse button is released, all communication units 107–109, 113 having representations enclosed by the displayed rectangle 301 are simultaneously selected for regrouping. Various other known techniques for creating shapes on a display can be used to simultaneously select a group of communication units for dynamic regrouping.

Still further, the terminal user may first select/indicate a geographic area (e.g., area 401 in FIG. 4) on the map 300, 400 and indirectly select each communication unit 107–109, 113 presently in the selected area 401 and each communication unit (e.g., communication unit 106 depicted in FIG. 4 as moving on BEACH STREET toward the selected area 401) that subsequently enters the selected area 401, subject to any filtering criteria. For example, after a communication unit 106 enters the selected area 401, the terminal 101, 201 preferably compares communication unit parameters or characteristics, such as communication unit identification or status, with criteria in the group or inbound filter to determine whether or not the entering communication unit should be included in the dynamic regrouping talkgroup. The selected area 401 may be constructed by the user using graphics techniques, such as "click and drag" rectangling techniques, or the selected area 401 may be pre-established (e.g., a county, a city, a subdivision, and so forth) and may be selected by clicking on or otherwise selecting a boundary of the area 401.

In the preferred embodiment, the map 300 provides a unique visual indication on the map of communication units (e.g., units 105, 107–109, 113 in FIG. 3) that have been regrouped to allow the user of the terminal 101 to easily differentiate regrouped communication units 105, 107–109, 113 from other communication units 106, 107, 110–112. For example, the representations of the regrouped communication units 105, 107–109, 113 may be illuminated (indicated in FIG. 3 by the dashed lines surrounding the representations of communication units 105, 107–109, and 113) to differentiate them from the representations of other communication units 106, 107, 110–112.

Once communication units have been selected or as communication units are being selected (e.g., when communication units are entering a previously selected geographic area or region), the terminal automatically groups them into a new talkgroup or talkgroups when such talkgroup or talkgroups were selected from a list or otherwise identified prior to selection of the communication units or the area. That is, after the terminal user has selected or identified a talkgroup for regrouping, the terminal 101, 201 stores the talkgroup identification in memory 123 and assigns the selected communication units to the stored talkgroup.

In an alternative embodiment, the user may first select the communication units to be regrouped or a regrouping area, and then select or identify the regrouping talkgroup and/or filter criteria. For example, the terminal user may select area 401, and then select the regrouping talkgroup from the list window 411 and the grouping criteria from the group filter after selecting the GROUP button 423.

The terminal user may de-select and ungroup communication units (e.g., after the need for regrouping has ended) using in any one or more of the techniques described above for selecting the communication units. That is, the terminal user may de-select and ungroup units individually using "point-and-click" or as a group, or units may be automatically de-selected and ungrouped as they leave the selected geographic area, subject to ungrouping filtering criteria. For example, after a communication unit exits the selected area 401, the terminal 101, 201 preferably compares communication unit parameters or characteristics, such as communication unit identification or status, with criteria in the ungroup or outbound filter to determine whether or not the exiting communication unit should be removed from the talkgroup established during the dynamic regrouping.

It should be noted that the above discussion relating to the cursor 311, 419 refers, of course, to a selection device 127 that comprises a computer mouse, a trackball, a touchpad, or the equivalent. As discussed above with respect to FIG. 1, other selection devices 127 may be used and, in such cases, the selection process would conform to the particular selection device 127. For example, if the selection device 127 was a touchscreen, the user of the terminal 101, 201 need only touch the screen in the area of the communication unit representation, the button 303 associated with selecting a target talkgroup or the button 409, 415, 423, 425 associated with selecting filter criteria. Alternatively, if the selection device 127 is a voice recognition device, the user need only verbally state the identity of the communication unit user (e.g., "POLICE CHIEF") or the desired area or area boundaries (e.g., "AREA BOUNDED BY APPLE STREET, BEACH STREET, AND CASTLE STREET"), the talkgroup identification (e.g., "GROUP TEN" or "BRAVO GROUP"), or the desired filter criteria (e.g., "EXCLUDE ALL PUBLIC WORKS RADIOS FROM REGROUPING") to thereby select such unit or area, talkgroup identification, or filter criteria.

Referring to FIGS. 1, 3, and 4, operation of the communication system 100 occurs substantially as follows in accordance with the present invention. The terminal's processor 121 receives location coordinates of the communication units 105–113 on a periodic basis from the AVL system 115, from the communication units 105–113 themselves, or from the wireless infrastructure 103 in accordance with known techniques. The processor 121, executing a program stored in the memory 123, instructs the GUI 119 to display the locations of the communication units 105–113 on the map 300 together with a button 303, 421, an icon, or a pull-down menu identifying target talkgroups available for dynamic regrouping and optionally indicating the permissibility of inputting filtering criteria associated with the dynamic regrouping. When the terminal 101 is a CAD terminal of a public safety dispatch center, the processor 121 on occasion receives a location of an emergency incident 302, 403 from the 911 system 117 and displays the location of the incident 302, 403 on the map 300, 400.

While the locations of the communication units 105–113 are displayed on the map 300, the user of the terminal 101 may desire to dynamically regroup communication units 105–113 to handle an incident 302, 403. For example, referring to FIG. 3, if there is an emergency incident 302 at the corner of BEACH STREET and CASTLE STREET, the terminal user (e.g., dispatch operator) may desire to temporarily group the communication units 105, 107–109, 113 that are either en route to the incident 302 or are already in the vicinity of the incident 302. In such a case, the terminal user uses the selection device 127 to select the communication units 105, 107–109, 113 to be regrouped and the talkgroup associated with the regrouping. As discussed above, the user may first select the communication units 105, 107–109, 113 (individually, collectively or both) and then select the talkgroup, or first select the talkgroup and then the communication units 105, 107–109, 113.

For example, the terminal user might use a computer mouse to move the cursor 311 onto a portion of a button, icon, or pull-down menu (not shown) indicating the user's desire to activate the regrouping program. Once in regrouping mode, the user might first select the communication units to be regrouped. For instance, the user might first select communication unit 105 using a "point and click" approach and then select units 107–109 and 113 using a "click and drag" approach to create a rectangle 301 that surrounds the selected units 107–109, 113. In the preferred embodiment, once a communication unit is selected, the terminal 101, 201 stores the communication unit's original talkgroup (i.e., pre-regrouping talkgroup) in the terminal's memory 123 to enable the terminal 101, 201 to automatically group the communication unit back into its original talkgroup upon completion of the need for the dynamic regrouping.

After the communication units 105, 107–109, 113 that are subject to the regrouping have been selected, the terminal user might move the cursor 311 onto a portion of button 303 and then click the mouse button, thereby indicating a request to enter a target talkgroup. Upon receiving such a request, the terminal 101, 201 displays one or more windows 305, 307 that allow the user to either type the target talkgroup identification (ID) into an entry field 306 using a keyboard or select the target talkgroup ID from a list of talkgroup IDs retrieved from the terminal's memory 123. Selection of a talkgroup ID from a list may be visually indicated to the user by highlighting the selected talkgroup ID as shown in FIG. 3. In addition, selection of a talkgroup ID preferably serves to indicate the conclusion of the terminal user's input with respect to the regrouping.

The processor 121 receives or accepts the terminal user's selections from the selection device 127 in accordance with known techniques and, upon detecting an end of the terminal user's input, automatically regroups the selected communication units 105, 107–109, 113 into the target talkgroup. That is, after receiving signaling from the selection device 127 indicating selection of communication units 105, 107–109, 113 and identification of a talkgroup, the processor 121 automatically accesses a communication resource 114 and sends a group command to the selected communication units 105, 107–109, 113 in accordance with the access scheme and communication protocols of the particular communication system 100. The group command preferably includes grouping information, such as the identification of the target talkgroup and, if the communications to be engaged in between the selected communication units 105, 107–109, 113 are intended to be secure, an encryption key. Techniques for accessing communication resources in conventional and trunked dispatch communication systems are well-known; thus no further discussion will be presented except to facilitate an understanding of the present invention.

Once regrouping has been completed, the regrouped communication units 105, 107–109, 113 can communicate quickly and simply by using PTT signaling in accordance with known techniques. In addition, all throughout the regrouping process, the terminal user remains in the map environment to continually monitor the incident 302 and add additional units to the regrouped talkgroup as the need arises.

As the need for regrouping diminishes (e.g., once the incident is no longer in progress or is under control), the terminal user may begin ungrouping or removing regrouped units from the regrouping talkgroup. To do so with respect to FIG. 3, the user may reselect regrouped communication units 105, 107–109, 113 either individually or collectively as described above. In the preferred embodiment, reselection of a regrouped communication unit 105, 107–109, 113 is automatically treated by the terminal processor 121 as a request to ungroup the reselected communication unit from the regrouping talkgroup and group the reselected communication unit back into its original talkgroup. Thus, upon detecting that a regrouped communication unit has been reselected, the terminal processor 121 automatically accesses a communication resource 114 and sends an ungroup command to the reselected communication unit in accordance with the access scheme and communication protocols of the particular communication system 100. The ungroup command preferably includes ungrouping information, such as the identification of the talkgroup from which the communication unit is be removed and the identification of the talkgroup, if any, that the communication unit is to rejoin. In addition to sending an ungroup command to the reselected communication unit, the processor 121 instructs the GUI 119 to return the communication unit's representation to a normal display (e.g., if the communication unit had been illuminated or equivalent upon its original selection) to indicate to the user that the communication unit has been removed from the dynamic regrouping talkgroup.

To summarize, once the terminal user has selected enough information (e.g., communication units and a target talkgroup) to enable the processor 121 to initiate dynamic regrouping, the processor 121 initiates such regrouping automatically, without further manual action by the terminal user, by preferably accessing a communication resource 114 and sending a group command. Thus, the terminal user, upon making his or her selections, need only continue monitoring the map 300 to determine if any other action is necessary to handle the incident 302.

FIG. 4 illustrates an alternative approach to performing dynamic regrouping in accordance with the invention. As depicted in FIG. 4, instead of receiving the user's selection of communication units directly, the terminal 101, 201 receives the user's selection of a geographic area or region 401 of the displayed portion of the system 100 that the user desires dynamic regrouping to occur in. For example, an emergency incident 403 may be occurring at the corner of BEACH STREET and CASTLE STREET in the city of Hometown. Thus, the terminal user might select the city of Hometown as the region 401 for dynamic regrouping. Alternatively, the user may construct the selected geographic area 401 using any type of graphics routines.

Preferably, after the user selects an area 401, the user inputs a target talkgroup ID either by entering the target talkgroup ID in the entry field 407 of window 405 or by selecting the ID from a list of IDs displayed in window 411. In addition to inputting the target talkgroup ID, the user in this embodiment also inputs filter criteria, for example, by using a computer mouse or other selection device 127 to move the cursor 419 onto a portion of a filter button 409, 415 and select the filter option. Selection of the filter option is illustrated in FIG. 4 by dashed box 417, which makes virtual button 415 appear as though it has been depressed or selected. Selection of the filter button 409, 417 preferably results in the opening of a "FILTERS" window 421 that either lists the permissible filter criteria or that allows the user to more particularly define which type of filter, group or ungroup, is desired by the user as depicted in FIG. 4. If the user desires a grouping-related filter (i.e., grouping-related criteria), the user uses the cursor 419 and selection device 127 to select the "GROUP" button 423 or a similar button, icon, or pull-down menu. Similarly, if the user desires an ungrouping-related filter (i.e., ungrouping-related or removal criteria), the user uses the cursor 419 and selection device 127 to select the "UNGROUP" button 423 or a similar button, icon, or pull-down menu.

Selection of either the "GROUP" button 423 or the "UNGROUP" button 425 preferably results in the opening of another window or windows (not shown) similar to window 405 and/or window 411 to allow the user to either input the filter criteria using the keyboard keys or select the filter criteria from a list of criteria. The types of filter criteria are preferably similar for both grouping and ungrouping and may include one or more of individual communication unit IDs, talkgroup IDs, and communication unit statuses, although the actual criteria selected for grouping may be different than that selected for ungrouping. In addition, the criteria chosen or entered after selecting either the GROUP button 423 or the UNGROUP button 425 may pertain to either inclusion or exclusion of the communication units from the selected function (i.e., grouping or ungrouping). For example, the terminal user may want to exclude from regrouping all public works communication units (e.g., by selecting the talkgroup ID of the public works department or by selecting each public works unit ID individually) and only allow regrouped communication units with an unassigned status to be removed from the target talkgroup upon exiting the selected area 401. In a preferred embodiment, the criteria for grouping and ungrouping is identical (i.e., the criteria used to include units in the target talkgroup is the same as the criteria used to remove units from the target talkgroup) and the terminal user need only enter one set of criteria to effectuate both types of filters.

After receiving the selection of the area 401, the ID of the target talkgroup, and the grouping and/or ungrouping criteria, the terminal processor 121 automatically determines whether any communication units are in the selected area 401 that meet the criteria for being regrouped. With respect to FIG. 4, the terminal processor 121 determines, based on location information periodically received from the AVL system 115, that communication units 107–109 and 113 are in the selected area 401. Accordingly, the processor 121 then determines whether units 107–109 and 113 meet the criteria for being included in the target talkgroup. Assuming that the terminal user selected a grouping criteria in which all communication units, except public works units, are to be regrouped, then the processor 121 would determine in this case that the units 107–109, 113 in the selected area 401 should be regrouped because the units 107–109, 113 are not affiliated with public works personnel. Once the grouping determination is made, the processor 121 accesses a communication resource 114 and sends a grouping command to the units 107–109, 113 via the communication resource 114 to execute the regrouping.

In addition, since an area 401 was selected with respect to the dynamic regrouping task, the terminal processor 121 continues to monitor for any other communication units that may enter the selected area 401. For example, as shown in FIG. 4, communication unit 106 (e.g., a fire engine) is traveling on BEACH STREET towards the incident 403 (as indicated by the arrow extending from the unit's representation). When the processor 121 receives an AVL update indicating that the unit 106 has entered the selected area 401, the processor 121 automatically compares the characteristics of the unit 106 with the filter criteria and groups or does not group the unit 106 accordingly. Since the grouping criteria used in the example above is based on whether or not the unit 106 is a public works unit, the processor 121 would automatically group the unit 106 into the target talkgroup upon determining that it entered the selected area 401 because unit 106 is not affiliated with public works personnel.

During the emergency or as the crisis subsides, some of the regrouped communication units 106–109, 113 may exit the selected area 401. The processor 121, upon determining through AVL updates that a regrouped unit 106–109, 113 has exited the selected area 401, determines whether the exiting unit 106–109, 113 should be removed from the regrouping talkgroup. This determination is preferably made by comparing the characteristics of the exiting unit 106–109, 113 with the ungroup filter criteria, if any. If no ungrouping criteria is specified, the processor 121 preferably removes the exiting unit 106–109, 113 from the regrouping talkgroup and returns the unit 106–109, 113 to the talkgroup it belonged to prior to the dynamic regrouping. If the ungrouping criteria is such that the exiting unit 106–109, 113 is intended to remain in the regrouping talkgroup upon exiting the selected area 401, then the processor 121 maintains the exiting unit 106–109, 113 in the talkgroup.

In some circumstances, the terminal user may want to override the grouping or ungrouping criteria for a particular unit 106–109, 113. In such a case, the processor 121 may be programmed to recognize that a user's individual selection of a regrouped unit 106–109, 113 serves to override the ungrouping criteria and ungroup the unit 106–109, 113 even though the ungrouping criteria would have prohibited such removal. Similarly, the processor 121 may be programmed to recognize that a user's individual selection of an ungrouped unit 106–109, 113 serves to override the grouping criteria and group the unit 106–109, 113 into the target talkgroup even though the grouping criteria would have prohibited such grouping.

As described above, the present invention provides a display-based terminal that enables a user of the terminal to dynamically regroup communication units being monitored by the user without ever leaving the map environment. In contrast to prior art CAD systems that require multiple displays to enable the CAD terminal user to both view communication unit locations, status information, and user identifications on a map and perform dynamic regrouping of communication units in the system, the present invention enables the terminal user to directly select the units for regrouping or an area associated with the regrouping, the target talkgroup, and, if desired, criteria for automatically grouping and ungrouping communication units all within a single map environment. Moreover, the present invention provides for tracking of communication unit locations and automatic execution of grouping and ungrouping upon a determination that a communication unit has entered or exited a selected regrouping area. Furthermore, the present invention enables the terminal user to select grouping and ungrouping criteria as necessary to insure the appropriate communication units are regrouped and remain regrouped throughout the duration of an incident.

Figure 5:
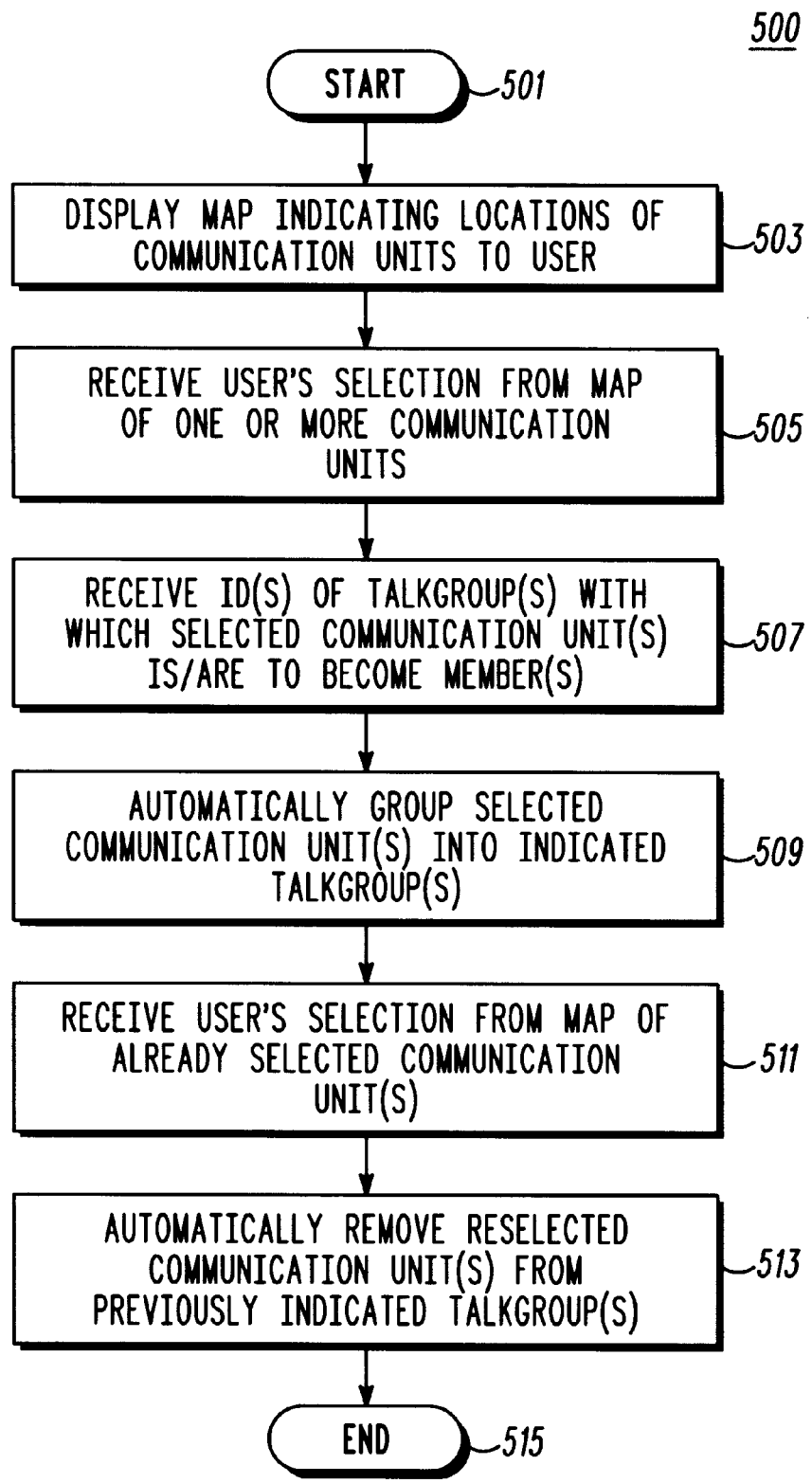
FIG. 5 illustrates a logic flow diagram of steps executed by a display-based terminal to dynamically group and ungroup communication units in accordance with one embodiment of the present invention.

FIG. 5 illustrates a logic flow diagram 500 of steps executed by a display-based terminal to dynamically group and ungroup communication units in accordance with one embodiment of the present invention. The logic flow begins 501 when the display-based terminal displays 503 a map to the terminal user indicating locations of communication units in at least a portion of the communication system. The communication units are preferably represented as icons having colors that represent their current status (e.g., off-duty, on-duty, assigned to incident, busy, and so forth). As discussed above with respect to FIGS. 3 and 4, the map display preferably identifies the users of the communication units and their locations on a local street map. In addition, the map display also preferably includes means, such as virtual buttons, pull-down menus, a list display, or a command input window or line, for allowing the user of the terminal to select a talkgroup for regrouping.

In the preferred embodiment, the terminal determines the locations of the communication units by receiving such locations from an AVL system coupled to either the terminal, as described above with respect to FIG. 1, or a wireless infrastructure that facilitates communication between the terminal and the communication units, as described above with respect to FIG. 2. Alternatively, the terminal may receive the communication unit locations from the communication units themselves (e.g., when the communication units include global positioning satellite (GPS) receivers or utilize some other known location-determining process, such as that described in U.S. Pat. No. 5,901,358, and transmit their locations to the terminal via the wireless infrastructure) or from the wireless infrastructure (e.g., when the wireless infrastructure utilizes known triangulation techniques to determine the locations of the communication units).

Some time after displaying the locations of the communication units, the terminal receives or accepts 505 the user's selection from the map of one or more communication units to be regrouped. As described above, the selection of the communication units may be performed on an individual basis or on a group basis. In addition to receiving communication unit selections, the terminal receives or accepts 507 the identification of at least one target talkgroup with which the selected communication units are to become members. The identification of each talkgroup may be entered on an input line using keystrokes from a keyboard if the terminal user knows the talkgroup's number, name, alias, or other identifying information. Alternatively, the terminal user may select each talkgroup identification from a list of talkgroup identifications provided on the map display either continuously or in response to the user's request for such list. It should be noted that although the reception of the talkgroup identification is depicted in FIG. 5 as following the reception of the communication unit selections, such order is preferred, but not required. Rather, the talkgroup and the communication units may be selected in any order, and the present invention is not limited to the order described in FIG. 5.

After the terminal has received one or more communication unit selections and one or more talkgroup identifications, the terminal automatically groups 509 the selected communication units into the indicated talkgroup or talkgroups. That is, the terminal dynamically regroups the selected communication units into a new, typically temporary talkgroup to enable the users of the selected communication units to communicate directly with each other. Therefore, the present invention enables the terminal user to dynamically regroup communication units to handle an incident displayed on the map, without requiring the terminal user to ever leave the map display. Accordingly, the present invention permits the terminal user to continue monitoring the situation that prompted the regrouping without interruption.

To automatically group the selected communication units, the terminal accesses a communication resource in accordance with the resource access protocol of the particular communication system, as described in more detail above and below, and sends a regroup command to the selected communication units via the system's wireless infrastructure and the communication resource. The regroup command includes grouping information, such as the new talkgroup identification for each target talkgroup and possibly an encryption key if one of the new talkgroups engages in secure communications, and instructs the selected communication units to reconfigure themselves into the new talkgroup or talkgroups.

Some time after the regrouping has taken place, the terminal may receive 511 the terminal user's selection from the map of one or more previously selected communication units. That is, the terminal may receive the user's selection of one or more regrouped communication units. Such selection may be performed on an individual basis or on a group basis using any one of the selection techniques described above. Once the regrouped communication units have been selected, the terminal automatically removes 513 the reselected communication units from the previously indicated talkgroup or talkgroups (i.e., from the talkgroup or talkgroups formed by the dynamic regrouping of block 509), and the logic flow ends 515. To automatically remove the reselected communication units from the talkgroup, the terminal accesses a communication resource in accordance with the resource access protocol of the particular communication system and sends an ungroup command to the selected communication units via the system's wireless infrastructure and the communication resource. In the preferred embodiment, the ungroup command instructs the reselected communication units to reconfigure themselves to rejoin the talkgroup or talkgroups they were members of prior to the regrouping of block 509. Alternatively, the ungroup command may simply instruct the reselected communication units to reconfigure themselves out of their current, temporary talkgroup or talkgroups.

Figure 6:
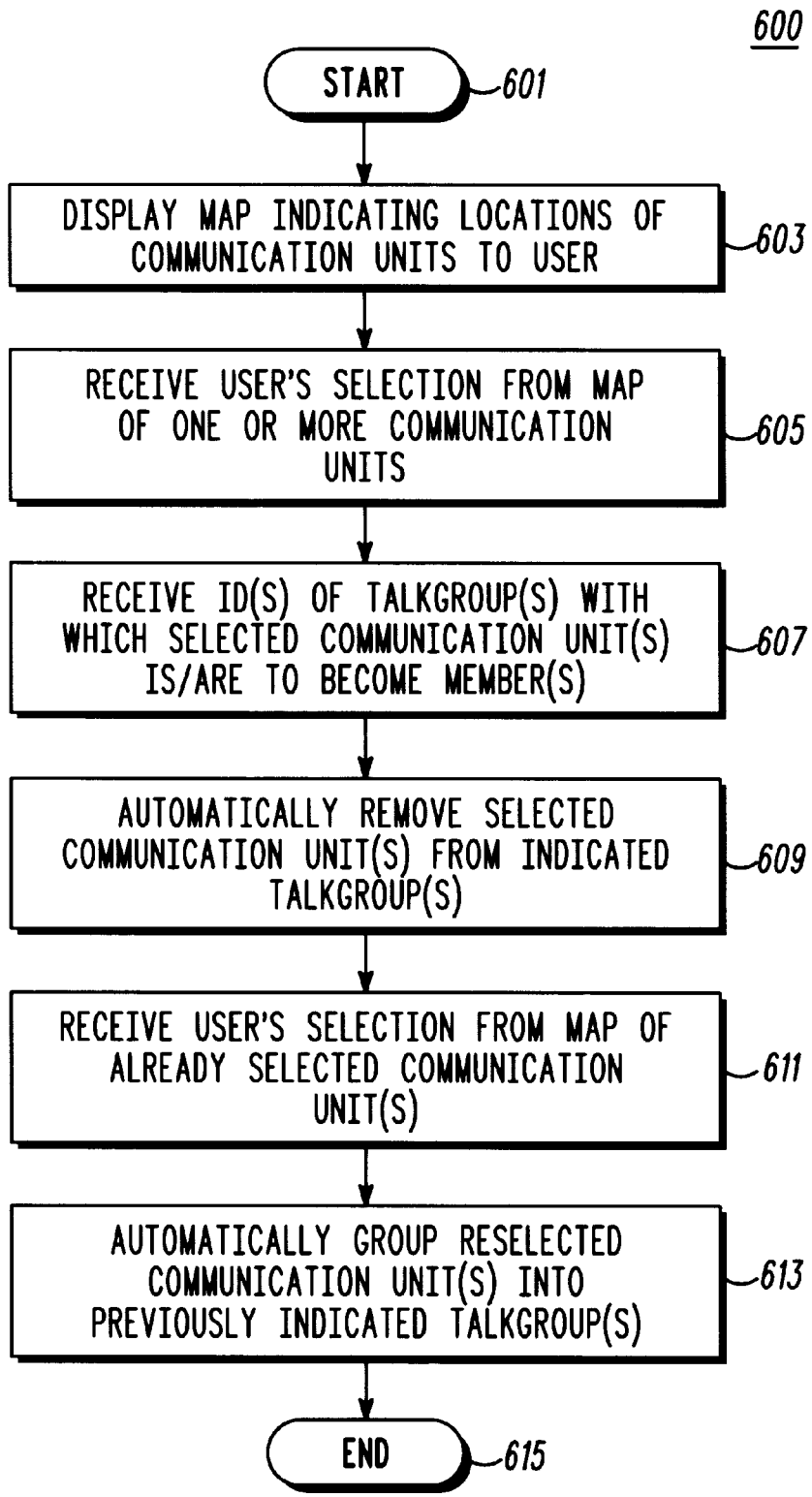
FIG. 6 illustrates a logic flow diagram of steps executed by a display-based terminal to dynamically ungroup and group communication units in accordance with another embodiment of the present invention.

FIG. 6 illustrates a logic flow diagram 600 of steps executed by a display-based terminal to dynamically ungroup and group communication units in accordance with another embodiment of the present invention. The logic flow begins 601 when the terminal displays 603 a map to the terminal user indicating locations of communication units in at least a portion of the communication system. Some time after the map is displayed, the terminal receives or accepts 605, 607 the user's selection of one or more communication units from the map and the identifications of one or more talkgroups of which the selected communication units are presently members. That is, similar to the logic flow described above with respect to FIG. 5, the terminal user selects communication units from the map (e.g., using a mouse or other selection device) to be affected by the dynamic regrouping. In contrast to the logic flow of FIG. 5, however, the terminal user enters or selects one or more talkgroup identifications (IDs) that are currently affiliated with the selected communication units, as opposed to being talkgroup identifications to which the selected communication units are to become affiliated as in FIG. 5.

As discussed above with respect to FIG. 5, the selection of the communication units and the input of the talkgroup identifications may occur in any order notwithstanding the preferred order depicted in FIG. 6. For example, the terminal might include a virtual mode button that permitted the terminal user to select either a group mode or an ungroup mode. After selecting the mode (ungroup mode in the case of FIG. 6), the terminal user could select the communication units and talkgroup IDs in either order to accomplish the ungrouping function.

After the communication unit selections and talkgroup identifications have been received, the terminal automatically removes 609 or ungroups the selected communication units from the indicated talkgroup or talkgroups. Removal of communication units from a talkgroup preferably comprises transmission of an ungroup command to the selected communication units as described above with respect to FIGS. 1 and 3–5, wherein the ungroup command includes the identification of the affected talkgroup. If the selected communication units are to be removed from multiple talkgroups, multiple ungroup commands may be sent, each identifying a particular talkgroup, or a single ungroup command may be sent identifying all affected talkgroups.

Some time after the selected communication units have been removed from a talkgroup, the terminal user may desire to regroup at least some of the ungrouped units back into the talkgroup. In such a case, the terminal receives or accepts 611 the user's selection from the map of some or all of the previously selected communication units and automatically groups 613 the reselected communication units into the previously indicated talkgroup or talkgroups, thereby ending 615 the logic flow. To automatically group the reselected communication units into the talkgroup, the terminal accesses a communication resource in accordance with the resource access protocol of the particular communication system and sends a group command to the reselected communication units via the system's wireless infrastructure and the communication resource. In the preferred embodiment, the group command includes the identification of the affected talkgroup or talkgroups and instructs the reselected communication units to reconfigure themselves to rejoin the talkgroup or talkgroups they were removed from in the ungrouping of block 609.

Therefore, upon selection or identification of the talkgroup or talkgroups in block 507 or block 607, the terminal temporarily stores the talkgroup identifications in memory in anticipation of the terminal user's ungrouping or regrouping of units into the talkgroup or talkgroups. The terminal software is preferably programmed to count the number of selections of a particular communication unit representation and perform either grouping or ungrouping based on the current count, unless the terminal has received some other command from the user to prohibit or preempt such count-based grouping or ungrouping. For example, during a particular time frame (e.g., a day, a week, and so forth) or during an event (e.g., during an emergency), communication units may be required to join and leave certain talkgroups. Accordingly, the present invention provides a simple mechanism for the terminal user to group and ungroup units from certain talkgroups by simply selecting and reselecting (or equivalently unselecting) the affected communication units directly from the map display. Such selection and reselection, together with selection or entry of one or more talkgroup identifications prior to the original grouping or ungrouping, enables the terminal user to group and ungroup communication units by utilizing standard GUI controls (e.g., moving a cursor in the map display and clicking a mouse button).

Figure 7:
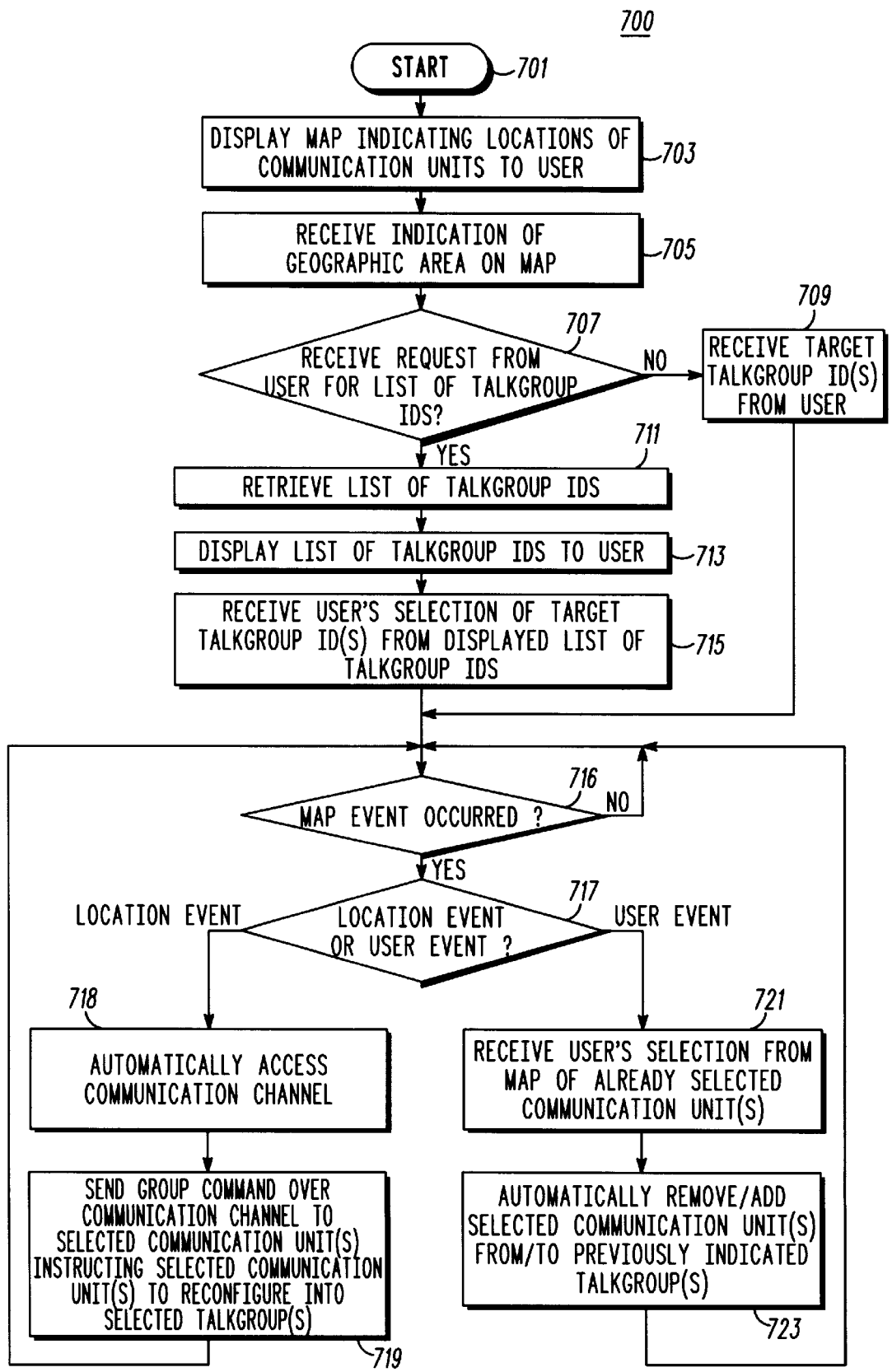
FIG. 7 illustrates a logic flow diagram of steps executed by a display-based terminal to dynamically group and ungroup communication units in accordance with yet another embodiment of the present invention.

FIG. 7 illustrates a logic flow diagram 700 of steps executed by a display-based terminal to dynamically group and ungroup communication units in accordance with yet another embodiment of the present invention. The logic flow begins 701 when the terminal displays 703 a map to the terminal user indicating locations of communication units in at least a portion of the communication system. Some time after the map is displayed, the terminal receives or accepts 705 an indication of at least one geographic area on the map. In the preferred embodiment, the geographic area is selected by a user of the display-based terminal 101. The geographic area may be selected by the user by using "click and drag" rectangling techniques, by otherwise constructing an area on the map, or by selecting a pre-established area (e.g., equating to a city, a county, a subdivision, a shopping mall, and so forth) on the map. The indication of at least one geographic area may also be received from another communication unit or terminal, including an automated crisis center, via wireline or wireless media.

In addition to receiving the indication of a geographic area, the terminal determines 707 whether it has received a request from the user for a stored list of talkgroup identifications. Such a request may be received by detecting that an appropriately labeled or designed virtual button, icon, or pull-down menu on the terminal's GUI has been depressed or selected (e.g., by using a computer mouse or a touchscreen). If the terminal has received a request for a talkgroup list, the terminal retrieves 711 or obtains the list from a database in memory, displays 713 the list to the terminal user, and awaits the user's selection or selections of target talkgroup identifications. Some time after displaying the talkgroup list, the terminal receives or accepts 715 the user's selection of one or more target talkgroup identifications from the displayed list. If, on the other hand, the terminal user has not requested the talkgroup list, the terminal receives or accepts 709 the target talkgroup identification or identifications from the user in some other manner, such as by being typed into the terminal through a sequence of keystrokes on the terminal's keyboard.

Although the indication of a geographic area is described above as occurring prior to the user's selection of a talkgroup identification, the selection of the talkgroup may precede the indication of the geographic area. In such a case, the terminal stores the talkgroup identification in memory for subsequent use upon indication of the geographic area and the communication units.

At step 716, it is determined whether or not a map event has occurred. In the preferred embodiment, a map event constitutes either a location event or a user event. A location event, in the preferred embodiment, occurs when a communication unit enters the indicated geographic area, when grouping occurs for a region where affected communication units are already in the area, and when a communication unit exits the indicated geographic area. After the area has been indicated, the terminal automatically determines whether any communication units are in the indicated area, enter the indicated area, or exit the indicated area and selects each such communication unit as part of a map event. To determine whether or not a communication unit is in the indicated area, the terminal compares the location of the communication unit (e.g., as received from the AVL system in latitude and longitude) to the boundaries (also in latitude and longitude) of the indicated area. A user event occurs when the user of the terminal enters data requested further grouping/removing of communication units from a talkgroup, as is described throughout this document.

If no map event has occurred at step 716, the process continues with step 716. If a map event has occurred at step 716, the process continues with step 717, where it is determined whether the map event is a location event or a user event. When a location event occurs, the process continues with step 718, and when a user event occurs, the process continues with step 721.

At step 718, the terminal automatically accesses a communication resource (e.g., a communication channel) in accordance with the access protocol of the particular communication system. For example, in a conventional system, the terminal preferably instructs an available base station in the wireless infrastructure to transmit and receive at respective frequencies. Alternatively, in a trunked system, the terminal preferably sends a control channel message to a system controller of the wireless infrastructure in support of the terminal's regrouping procedure.

Having accessed the communication channel, the terminal sends 719 a group command (which group command provides instructions to group, ungroup or remove, and/or regroup communication units into and/or from the intended talkgroup(s)) over the communication channel to the selected communication units instructing the selected communication units to reconfigure themselves with respect to the selected talkgroup or talkgroups. The group command preferably includes grouping/removing information, such as the identification of the talkgroup and possibly an encryption key if the talkgroup will be engaging in secure communications, that enables the selected communication units to perform their reconfiguration associated with the dynamic regrouping. Once regrouping has been completed, the selected communication units can begin group communications through the use of push-to-talk (PTT) signaling as is known in the art. After step 719, the process continues with step 716.

At step 721, the terminal receives the terminal user's selection from the map of one or more selected communication units. Such selection may be performed on an individual basis or on a group basis using any one of the selection techniques described above. Alternatively, the terminal user might select an area or region (e.g., the area selected in block 705) from the map that includes the communication unit and, thereby, indirectly select the communication unit. Once the communication units have been selected, the terminal automatically removes/groups 723 the selected communication units from/into the previously indicated talkgroup or talkgroups, depending on the nature of the user event, which automatic removing/adding occurs by automatically accessing a communication resource and sending the appropriate group command as described above, and the logic flow continues with step 716.

Figure 8:
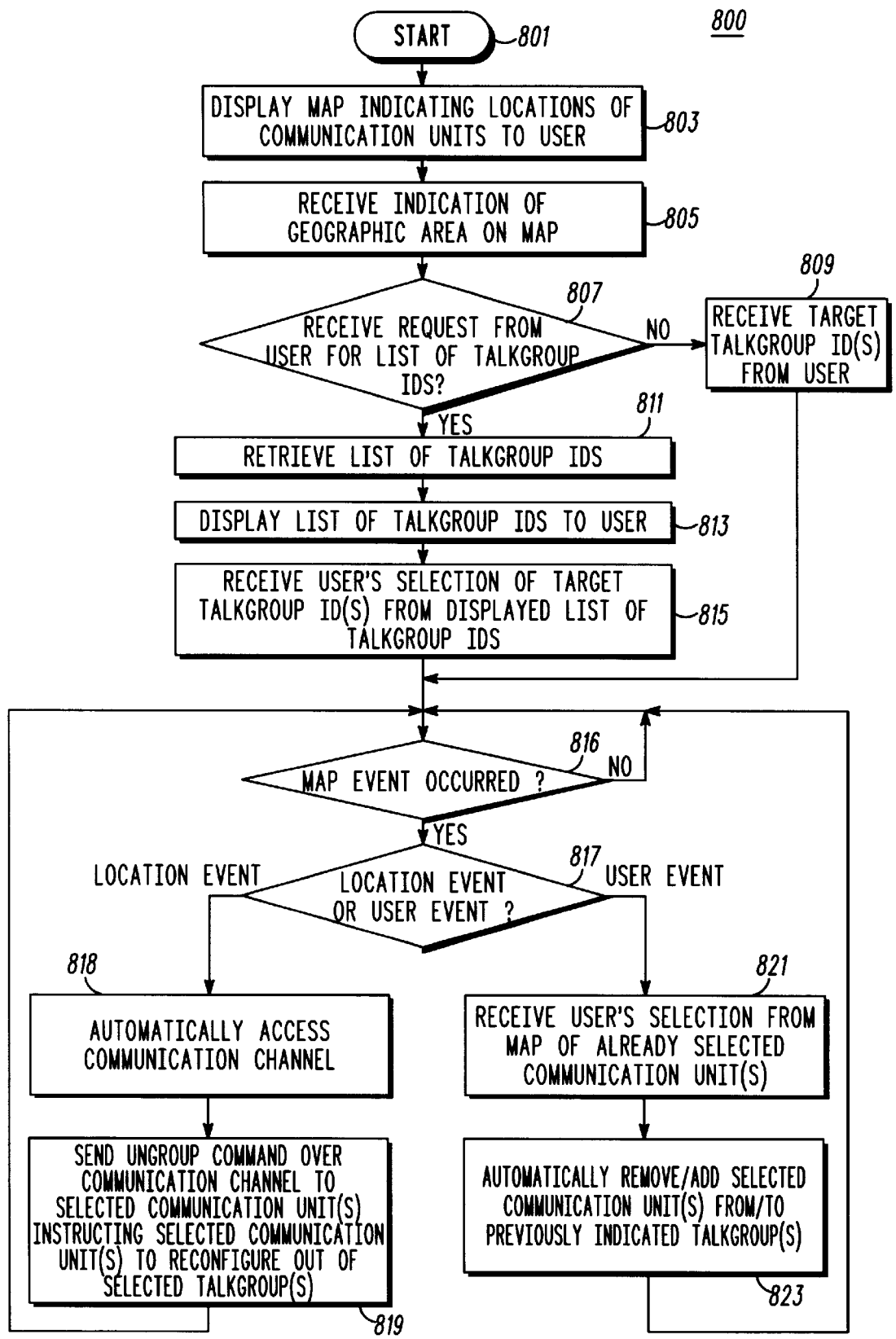
FIG. 8 illustrates a logic flow diagram of steps executed by a display-based terminal to dynamically ungroup and group communication units in accordance with yet another embodiment of the present invention.

FIG. 8 illustrates a logic flow diagram 800 of steps executed by a display-based terminal to dynamically ungroup and group communication units in accordance with yet another embodiment of the present invention. The logic flow begins 801 when the terminal displays 803 a map to the terminal user indicating locations of communication units in at least a portion of the communication system. Some time after the map is displayed, the terminal receives or accepts 805 an indication of at least one geographic area on the map.

In the preferred embodiment, the geographic area is selected by a user of the display-based terminal 101. The geographic area may be selected by using "click and drag" rectangling techniques, by otherwise constructing an area on the map, or by selecting a pre-established area on the map. The indication of at least one geographic area may also be received from another communication unit or terminal, including an automated crisis center, via wireline or wireless media.

In addition to receiving the indication of a geographic area, the terminal determines 807 whether it has received a request from the user for a stored list of talkgroup identifications. Such a request may be received by detecting that an appropriately labeled or designed virtual button, icon, or pull-down menu on the terminal's GUI has been depressed or selected (e.g., by using a computer mouse or a touchscreen). If the terminal has received a request for a talkgroup list, the terminal retrieves 811 or obtains the list from a database in memory, displays 813 the list to the terminal user, and awaits the user's selection or selections of target talkgroup identifications. Some time after displaying the talkgroup list, the terminal receives or accepts 815 the user's selection of one or more target talkgroup identifications from the displayed list. If, on the other hand, the terminal user has not requested the talkgroup list, the terminal receives or accepts 809 the target talkgroup identification or identifications from the user in some other manner, such as by being typed into the terminal through a sequence of keystrokes on the terminal's keyboard.

Although the indication of a geographic area is described above as occurring prior to the user's selection of a talkgroup identification, the selection of the talkgroup may precede the indication of the geographic area. In such a case, the terminal stores the talkgroup identification in memory for subsequent use upon indication of the geographic area and the communication units.

At step 816, it is determined whether or not a map event has occurred. In the preferred embodiment, a map event constitutes either a location event or a user event. A location event, in the preferred embodiment, occurs when a communication unit enters the indicated geographic area, when grouping occurs for a region where affected communication units are already in the area, and when a communication unit exits the indicated geographic area. After the area has been indicated, the terminal automatically determines whether any communication units are in the indicated area, enter the indicated area, or exit the indicated area and selects each such communication unit as part of a map event. To determine whether or not a communication unit is in the indicated area, the terminal compares the location of the communication unit (e.g., as received from the AVL system in latitude and longitude) to the boundaries (also in latitude and longitude) of the indicated area. A user event occurs when the user of the terminal enters data requested further grouping/removing of communication units from a talkgroup, as is described throughout this document.

If no map event has occurred at step 816, the process continues with step 816. If a map event has occurred at step 816, the process continues with step 817, where it is determined whether the map event is a location event or a user event. When a location event occurs, the process continues with step 818, and when a user event occurs, the process continues with step 821.

At step 818, the terminal automatically accesses a communication resource (e.g., a communication channel) in accordance with the access protocol of the particular communication system and sends 819 an ungroup command (which ungroup command provides instructions to group, ungroup or remove, and/or regroup communication units into and/or from the intended talkgroup(s)) over the communication resource to the selected communication units instructing the selected communication units to reconfigure themselves with respect to the selected talkgroup or talkgroups. The ungroup command preferably includes the identification of the talkgroup or talkgroups from/to which the selected communication units are to be removed/grouped. In the preferred embodiment, the selected communication units and the terminal are programmed to reconfigure the selected communication units into a temporary talkgroup or talkgroups, until the time when the communication units are regrouped into the talkgroup(s) they belonged prior to being removed. Alternatively, the communication units may be reassigned, after the removal step, to a different talkgroup from the talkgroup assigned prior to removal. After step 819, the process continues with step 816.

At step 821, the terminal receives the terminal user's selection from the map of one or more selected communication units. Such selection may be performed on an individual basis or on a group basis using any one of the selection techniques described above. Alternatively, the terminal user might select an area or region (e.g., the area selected in block 805) from the map that includes the communication unit and, thereby, indirectly select the communication unit. Once the communication units have been selected, the terminal automatically groups/removes 823 the selected communication units into/from the previously indicated talkgroup or talkgroups, depending on the nature of the user event, which automatic grouping/removing occurs by automatically accessing a communication resource and sending the appropriate group command as described above, and the logic flow continues with step 816.

One use for the method of FIG. 8 is to remove communication units from a talkgroup once they have left a geographic area in which the communication units were regrouped for a specific purpose. The method of FIG. 8 is also useful in situations when it is desirable to remove communication units from a talkgroup, such as when an emergency is particularly sensitive, and it is desirable for a talkgroup or certain members of a talkgroup to be excluded from communications in the indicated area. This method is useful when radio silence is desirable. Such talkgroup members may be rejoined to the talkgroup when the emergency is over or when the communication unit leaves the indicated area, as chosen by the user.

Figure 9:
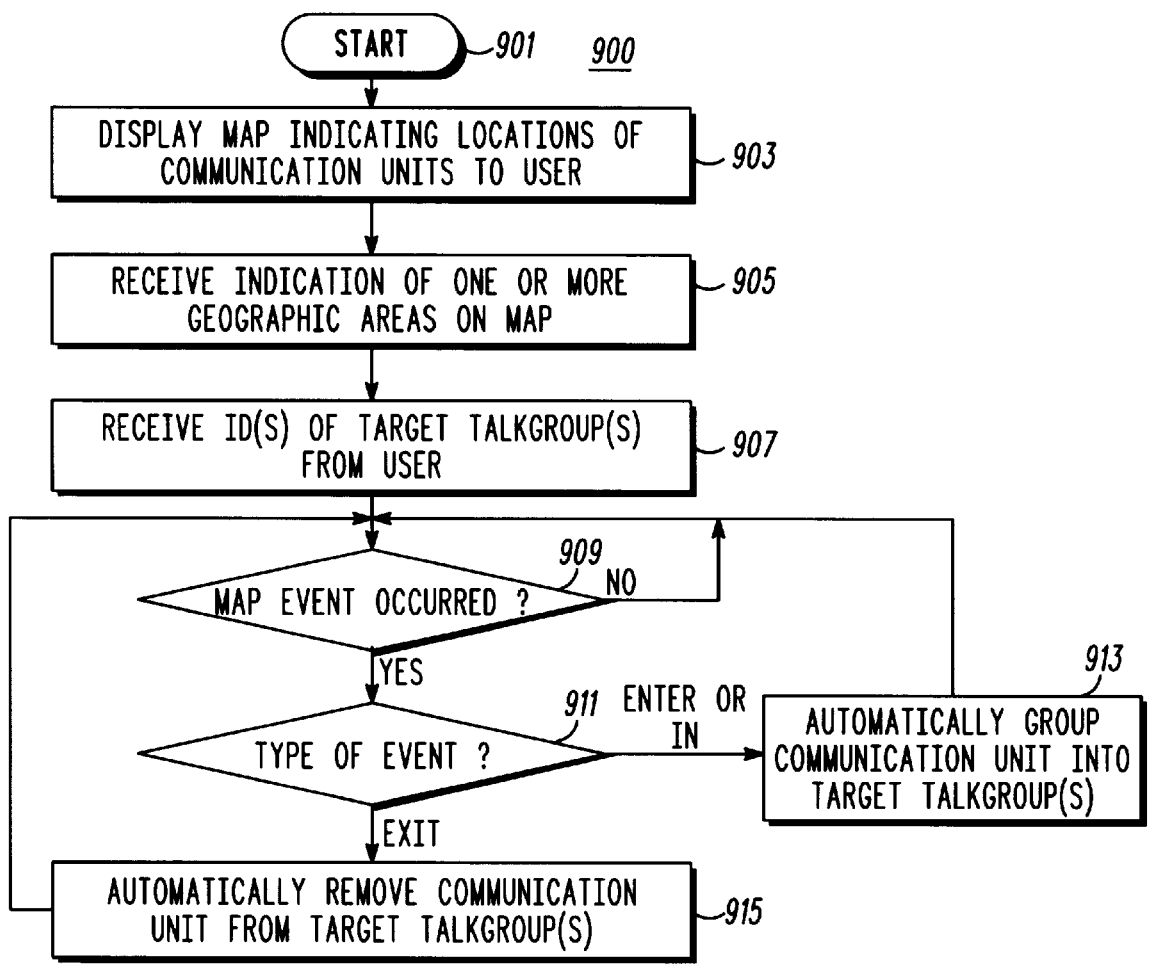
FIG. 9 illustrates a logic flow diagram of steps executed by a display-based terminal to dynamically group and ungroup communication units in accordance with yet another embodiment of the present invention.

FIG. 9 illustrates a logic flow diagram 900 of steps executed by a display-based terminal to dynamically group and ungroup communication units in accordance with yet another embodiment of the present invention. The logic flow begins 901 when the terminal displays 903 a map to the terminal user indicating locations of communication units in at least a portion of the communication system. Some time after the map is displayed, the terminal receives or accepts 905 an indication of one or more geographic areas on the map. In the preferred embodiment, the geographic area is selected by a user of the display-based terminal 101. Each geographic area may be selected by using "click and drag" rectangling techniques, by otherwise constructing an area on the map, or by selecting a pre-established area on the map. The indication of at least one geographic area may also be received from another communication unit or terminal, including an automated crisis center, via wireline or wireless media. In addition to receiving the user's selection of an area on the map, the terminal receives or accepts 907 identification of a target talkgroup from the user. The target talkgroup may be selected from a list of target talkgroups displayed to the user or may be input audibly (e.g., when the terminal includes a voice recognition device) or via a keyboard.

At step 909, preferably periodically (e.g., once every second or after receiving a communication unit location update from an AVL system or otherwise), the terminal determines whether a map event has occurred. Map events, such as location events and user events, are described above and include, for example, when a communication unit has entered or is originally known to be located in the indicated geographic area, or the unit has exited the indicated area. If no map event has occurred, the terminal continues monitoring for map events at step 909. If, however, a map even has occurred, the process continues with step 911, where it is determined what type of map event occurred. If the map event is a location event, such as a regrouping type of event, e.g., when a communication unit first enters the area or is located in the area when the area is first indicated, the terminal automatically dynamically groups 913 such communication units in the previously indicated target talkgroup, and the process continues with step 909. The terminal preferably performs such dynamic regrouping by accessing a communication resource and sending a group command to the affected communication units over the communication resource, as described in detail above.

Thus, in this embodiment, the terminal dynamically regroups communication units that are in the indicated area at the time the area is originally indicated or that enter the indicated area after the area has been indicated, but during the regrouping time period as determined by the terminal user. For example, an emergency response dispatcher may need to regroup fire department radios, city police radios, county police radios, and ambulance radios to handle an emergency at a shopping mall. In this embodiment, the dispatcher selects/indicates an area surrounding the shopping mall from the map and the terminal automatically regroups the fire, police, and ambulance radios into a talkgroup as the radios enter the indicated area to enable PTT communications between the fire, police, and ambulance personnel.

If the map event at step 911 is a location event such as a removing/ungrouping type of event, e.g., when a communication unit exits the indicated area, the terminal automatically removes 915 the exited communication units from the target talkgroup, and the logic flow continues with step 909. Removal of the exited communication units is preferably performed by accessing a communication resource and sending an ungroup command to the exited communication units over the communication resource, as described in detail above.

Figure 10:
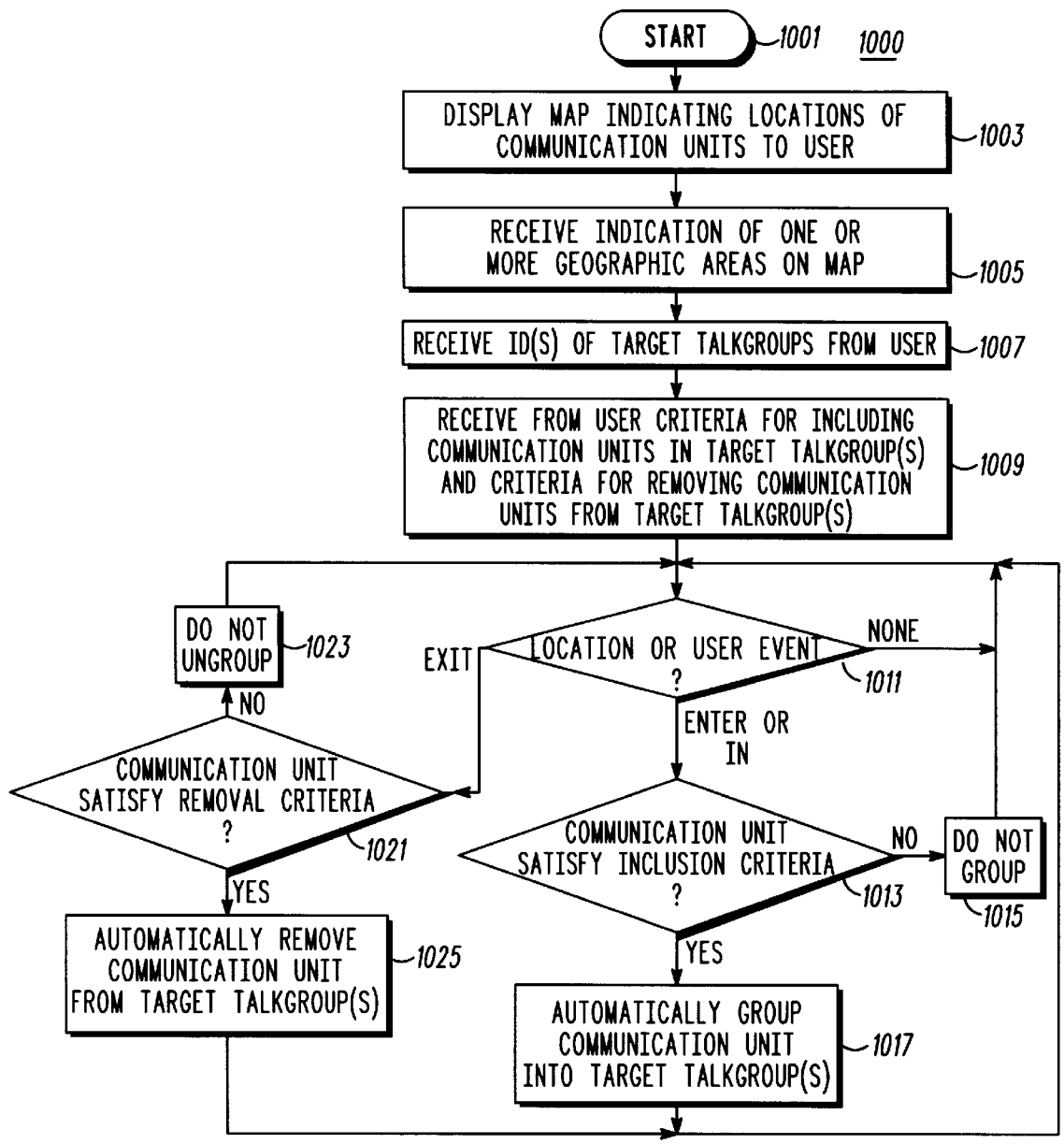
FIG. 10 illustrates a logic flow diagram of steps executed by a display-based terminal to dynamically group and ungroup communication units in accordance with yet another embodiment of the present invention.
Figure 11:
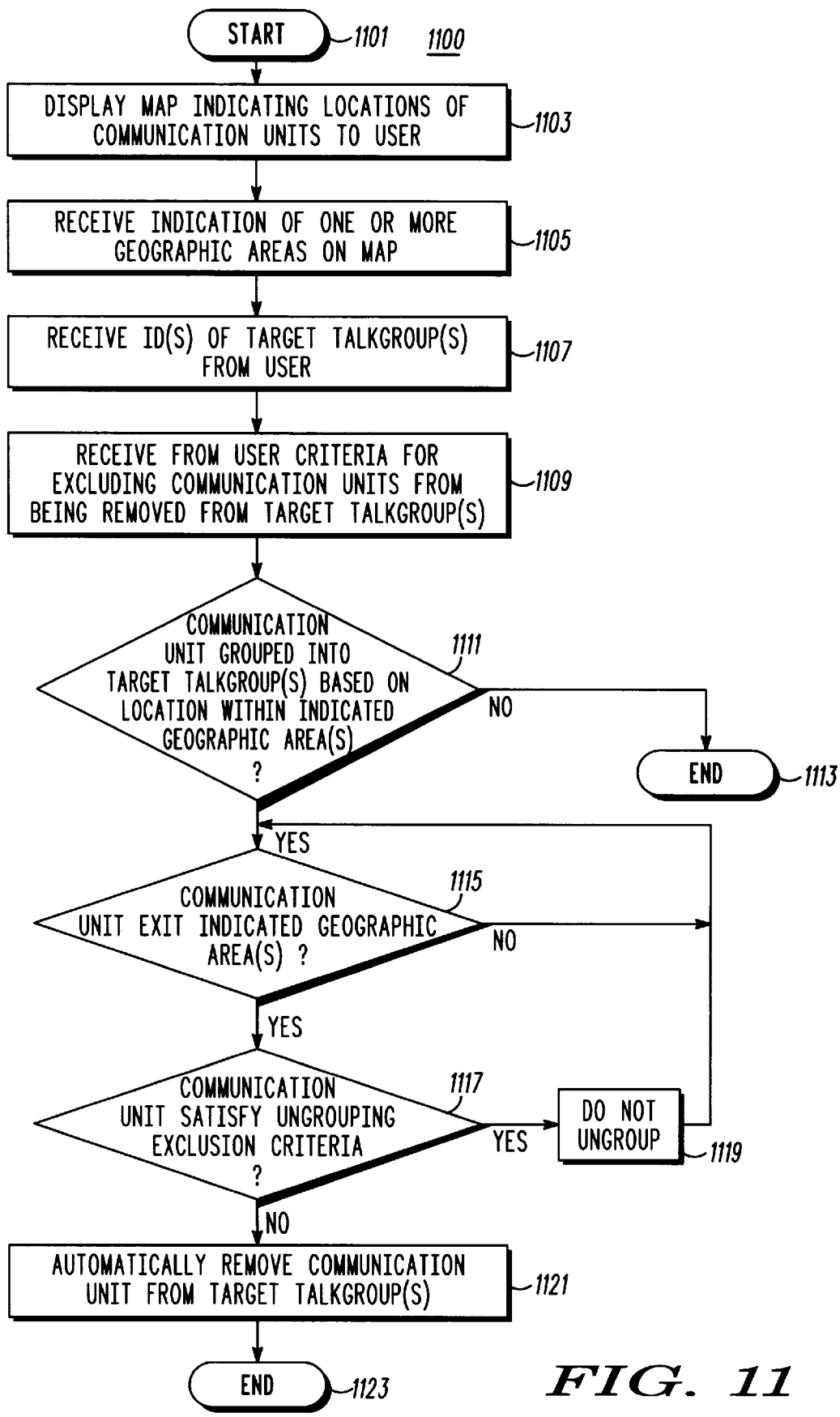
FIG. 11 illustrates a logic flow diagram of steps executed by a display-based terminal to dynamically group and ungroup communication units in accordance with yet another embodiment of the present invention.
Figure 12:
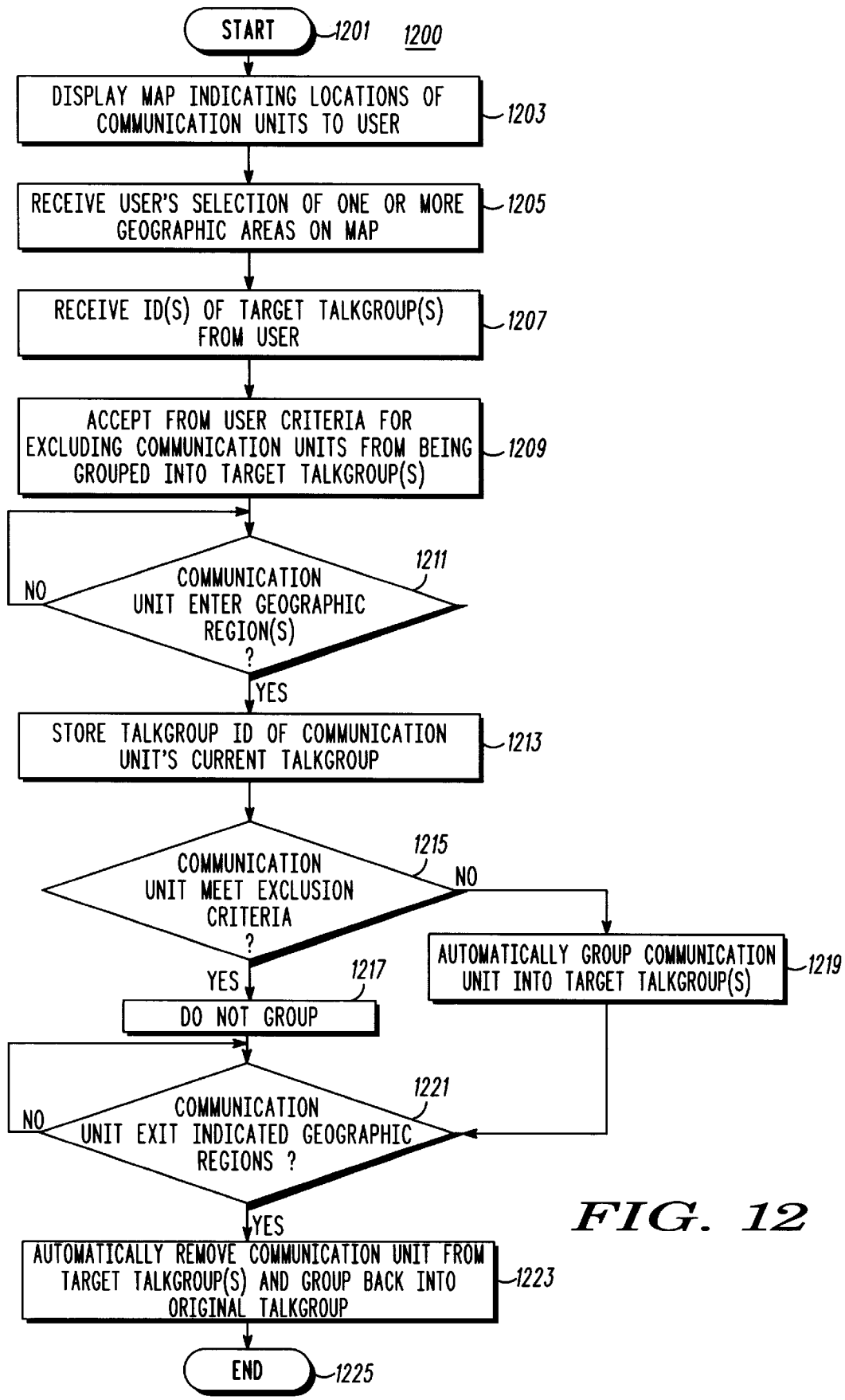
FIG. 12 illustrates a logic flow diagram of steps executed by a display-based terminal to dynamically group and ungroup communication units in accordance with yet another embodiment of the present invention.

An optional feature of the present invention is the use of criteria and/or filters to determine which communication units will be grouped and/or removed from a talkgroup. Criteria and/or filters may be used to include or exclude communication units in the grouping process, and/or to include or exclude communication units in the ungrouping/removal process. This feature allows for further refinement of the grouping and ungrouping processes. Units may be grouped/removed based on meeting/not meeting one or more criteria. For example, if a police emergency takes place, the criteria selected may be to include only police or to exclude everyone but the police. A certain emergency make require the captain or other high-ranking person remain in the talkgroup, no matter if this person leaves the area or not. The present invention provides that a unit or group of units not be removed from such a talkgroup even if the unit(s) leave(s) the designated area. Other emergencies may require certain types of communication groups but not others to participate in the emergency, e.g., a large fire requiring firemen, police, and public works, but not dog catchers and parks personnel. As a further enhancement, the user may select communication units, regardless of their location or talkgroup affiliation, to be grouped/removed without meeting the criteria. The use of criteria and/or filters may be added to the methods shown in the flowcharts of FIGS. 7, 8, and 9. FIG. 10, FIG. 11, and FIG. 12 are illustrations/examples showing how criteria (filters) may be utilized in conjunction with the grouping and ungrouping techniques of the present invention.

FIG. 10 illustrates a logic flow diagram 1000 of steps executed by a display-based terminal to dynamically group and ungroup communication units in accordance with yet another embodiment of the present invention. The logic flow begins 1001 when the terminal displays 1003 a map to the terminal user indicating locations of communication units in at least a portion of the communication system. Some time after the map is displayed, the terminal receives 1005, 1007 an indication of one or more geographic areas on the map and an identification of at least one target talkgroup. In the preferred embodiment, the geographic area is selected by a user of the display-based terminal 101. Each geographic area may be selected by using "click and drag" rectangling techniques, by otherwise constructing an area on the map, or by selecting a pre-established area on the map, such as a county, a city, a city block, a subdivision, and so forth. The indication of at least one geographic area may also be received from another communication unit or terminal, including an automated crisis center, via wireline or wireless media. The target talkgroup or talkgroups may be selected from a list of target talkgroups displayed to the user or may be input audibly (e.g., when the terminal includes a voice recognition device) or via a keyboard. Once received, the terminal preferably stores the talkgroup ID(s) and area boundaries in memory.

In addition to receiving the indication of at least one area on the map and selection of at least one talkgroup, the terminal receives 1009 a first set of criteria (target talkgroup inclusion/exclusion criteria) from the user for including communication units in the target talkgroup and a second set of criteria (target talkgroup removal criteria) for removing communication units from the target talkgroup once such communication units are grouped into the target talkgroup. That is, the user preferably specifies the individual identifications, talkgroup identifications, and/or status of the communication units that are either intended to be included in the target talkgroup upon their entering the indicated geographic area or are not intended to be included the target talkgroup upon their entering the indicated geographic area. Analogously, the user preferably specifies the individual identifications, talkgroup identifications, and/or status of the communication units that either are to be removed from the target talkgroup upon their exiting the indicated geographic area or are not to be removed from the target talkgroup upon their exiting the indicated geographic area.

Selection or specification of target talkgroup inclusion criteria may be made by using a computer mouse to move a cursor on top of a virtual inbound or group filter button on the terminal's display. A click of the mouse button when the cursor is on top of the virtual inbound filter button indicates to the terminal that the user desires to input talkgroup inclusion criteria. After indicating his or her desire to input talkgroup inclusion criteria, the user preferably uses the alpha-numeric keys of the terminal's keyboard (e.g., if the user knows the talkgroup or individual identifications to be included in the target talkgroup) or the mouse (e.g., if the user desires to access a list of talkgroup identifications, individual identifications, or statuses) to input the criteria into the terminal for storage in an inbound filter portion of the terminal's memory. Alternatively, when the terminal accepts both inclusion and exclusion criteria for target talkgroup members, the selection of the inbound filter may result in the option of inputting inclusion or exclusion criteria, in which case, the terminal user must first select which criteria (talkgroup inclusion or talkgroup exclusion) he or she desires to input before actually inputting the criteria into the terminal for storage in the inbound filter portion of the terminal's memory.

For example, if the terminal user wants to limit entry into the target talkgroup to police and fire personnel, the user might input or select the talkgroups associated with fire and police personnel for storage in the inbound filter as talkgroup inclusion criteria. Alternatively, the user might want all communication units being monitored by the terminal user to be regrouped upon entry into the indicated area, except for any units already assigned to an incident. In such a case, the user might input or select the "assigned" status for storage in the inbound filter as the talkgroup exclusion criterion.

Similarly, selection or specification of talkgroup removal criteria may be made by using a computer mouse to move a cursor on top of a virtual outbound or ungroup filter button on the terminal's display. A click of the mouse button when the cursor is on top of the virtual outbound filter button indicates to the terminal that the user desires to input talkgroup removal criteria. After indicating his or her desire to input talkgroup removal criteria, the user preferably uses the alpha-numeric keys of the terminal's keyboard (e.g., if the user knows the talkgroup or individual identifications to be removed from the target talkgroup) or the mouse (e.g., if the user desires to access a list of talkgroup identifications, individual identifications, or statuses) to input the criteria into the terminal for storage in an outbound filter portion of the terminal's memory. Alternatively, when the terminal accepts both inclusion and exclusion removal criteria for target talkgroup members, the selection of the outbound filter may result in the option of inputting inclusion or exclusion removal criteria, in which case, the terminal user must first select which criteria (removal inclusion or removal exclusion) he or she desires to input before actually inputting the criteria into the terminal for storage in the outbound filter portion of the terminal's memory. In a preferred embodiment, the user enters only talkgroup inclusion criteria and the terminal automatically uses the same criteria as talkgroup removal criteria.

For example, if the terminal user wants to limit removal from the talkgroup to those communication units being used by uniformed police officers, the user might input or select the individual identifications of such police personnel for storage in the outbound filter as talkgroup removal inclusion criteria. Alternatively, the user might want all communication units being monitored by the terminal user to be removed from the target talkgroup upon exiting the indicated area, except for any units remaining assigned to the incident that resulted in the indication of the geographic area in the first place. In such a case, the user might input or select the "assigned" status for storage in the outbound filter as the talkgroup removal exclusion criterion.

The terminal determines 1011 whether a location event or user event, as described above, has occurred. If no location event or user event has occurred, the terminal continues monitoring 1011 for such an event. If a location event or user event occurs, such as a communication unit entering or is presently located in the indicated geographic area at the time of regrouping or the user enters an instruction to group one or more communication units, the process continues with step 1013, where the terminal determines whether the communication unit satisfies the talkgroup inclusion criteria. That is, the terminal determines whether characteristics of the communication unit satisfy the criteria for inclusion in the target talkgroup or satisfy the criteria for exclusion from the target talkgroup, depending on whether one or both criteria was received and stored pursuant to block 1009.

At step 1011, the terminal may accept from the user the selection of a specific communication unit that will be automatically grouped without need to meet any other criteria at step 1013. The terminal user may select a unit from the map either directly (i.e., individually or as one of a group) or indirectly (e.g., by indicating the area or region containing the regrouped unit) using a computer mouse, a keyboard, a voice recognition device, or some other selection device. If the terminal user has selected one or more communication units (i.e., the terminal has received the user's selection from the map), the terminal treats the selection as a criterion for grouping the communication unit with the target talkgroup and automatically groups the selected communication unit with the target talkgroup. If, on the other hand, the terminal has not received the user's selection of a communication unit, the terminal continues to monitor for location events.

If the communication unit does not satisfy the talkgroup inclusion criteria or alternatively does satisfy the talkgroup exclusion criteria and, therefore, is not intended to be a member of the target talkgroup, the terminal does not regroup 1015 the unit and the logic flow continues with step 1011. On the other hand, if the communication unit does satisfy the talkgroup inclusion criteria or alternatively does not satisfy the talkgroup exclusion criteria and, therefore, is intended to be a member of the target talkgroup, the terminal automatically groups 1017 the communication unit into the target talkgroup, preferably by opening a communication resource and sending a group command to the communication unit as described above, and the process continues with step 1011.

If at step 1011, the location event indicates that one or more communication units have exited the indicated geographic area, the terminal determines 1021 whether the communication unit satisfies the removal criteria. That is, the terminal determines whether characteristics of the exiting communication unit satisfy the criteria for being removed from the target talkgroup or satisfy the criteria for exclusion from being removed from the target talkgroup, depending on whether one or both criteria was received and stored pursuant to block 1009.

If the communication unit does not satisfy the removal criteria or alternatively does satisfy the exclusion from removal criteria and, therefore, is intended to remain a member of the target talkgroup, the terminal does not ungroup or remove 1023 the unit from the target talkgroup and the logic flow continues with step 1011. On the other hand, if the communication unit does satisfy the removal criteria or alternatively does not satisfy the exclusion from removal criteria and, therefore, is no longer intended to be a member of the target talkgroup, the terminal automatically removes 1025 the communication unit from the target talkgroup preferably by opening a communication resource and sending an ungroup command to the communication unit as described above, and the process continues with step 1011. Additionally, at step 1025, the terminal may also accept from the user the selection, as described above, of a specific communication unit(s) that will be automatically removed without need to meet any other criteria (not shown).

At step 1011, the terminal may accept from the user the selection of a specific communication unit that will be automatically ungrouped/removed without need to meet any other criteria at step 1021. The terminal user may select a unit from the map either directly (i.e., individually or as one of a group) or indirectly (e.g., by indicating the area or region containing the regrouped unit) using a computer mouse, a keyboard, a voice recognition device, or some other selection device. If the terminal user has selected one or more communication units (i.e., the terminal has received the user's selection from the map), the terminal treats the selection as a criterion for removing the communication unit from the target talkgroup and automatically removes the selected communication unit from the target talkgroup. If, on the other hand, the terminal has not received the user's selection of a communication unit, the terminal continues to monitor for location events.

In the preferred embodiment, the terminal preferably stores the talkgroup or talkgroups that each regrouped communication unit belongs to in memory immediately before regrouping the communication unit into the target talkgroup as described above with respect to block 1017. Therefore, upon removing the regrouped communication unit from the target talkgroup, the terminal preferably groups the communication unit back into its original talkgroup or talkgroups.

FIG. 11 illustrate a logic flow diagram 1100 of steps executed by a display-based terminal to dynamically group and ungroup communication units in accordance with yet another embodiment of the present invention. FIG. 11 shows an example of utilizing criteria to exclude communication units from being removed from a talkgroup. The logic flow begins 1101 when the terminal displays 1103 a map to the terminal user indicating locations of communication units in at least a portion of the communication system. Some time after the map is displayed, the terminal receives 1105, 1107 and preferably stores in memory an indication of one or more geographic areas on the map and an identification of at least one target talkgroup. Indication of the geographic area or areas and identification of the target talkgroup or talkgroups may be made using in any one or more of the various techniques described above.

In addition to receiving the indication of at least one area on the map and selection of at least one talkgroup, the terminal receives 1109 and preferably stores in memory criteria from the user for excluding communication units from being removed from the target talkgroup once such communication units are grouped into the target talkgroup. That is, the user preferably specifies the individual identifications, talkgroup identifications, and/or statuses of the communication units that either are to be removed from the target talkgroup upon their exiting the indicated geographic area or are not to be removed from the target talkgroup upon their exiting the indicated geographic area. Alternatively, the terminal user may select (e.g., using a computer mouse, keyboard, voice recognition device, or other selection device) a communication unit that has already been regrouped into the target talkgroup and such selection may be the criteria for excluding the selected communication unit from being removed from the target talkgroup in the event such communication unit exits the indicated geographic area.

After receiving the geographic area indication, talkgroup identification, and talkgroup removal exclusion criteria, the terminal determines 1111 whether any communication unit being monitored by the terminal user has been regrouped into the target talkgroup based on the communication unit's location within or entry into the indicated geographic area. Step 1111 is optional. If no communication unit has been regrouped on such a basis, the logic flow ends 1113. If, however, a communication unit has been regrouped on such a basis, the terminal determines 1115 whether any of the regrouped communication units have exited the indicated geographic area. Such a determination is preferably made periodically at times corresponding to AVL system-provided communication unit location updates by comparing the location of the particular communication unit to the boundaries of the indicated area that were stored in the terminal's memory upon the terminal's receipt of the indication of the geographic area in block 1105. If no regrouped communication unit has exited the indicated area, the terminal continues to monitor for such an exit. If a regrouped communication unit has exited the indicated area, the terminal determines 1117 whether the exiting communication unit or characteristics thereof satisfy the ungrouping or removal exclusion criteria received and stored at block 1109. If the exiting communication unit satisfies the criteria, the terminal does not remove or ungroup 1119 the exiting communication unit from the target talkgroup, and the logic flow continues at decision block 1115, wherein the terminal determines if any other regrouped communication unit has exited the indicated geographic area. On the other hand, if the exiting communication unit does not satisfy the criteria, the terminal automatically ungroups or removes 1121 the exiting communication unit from the target talkgroup, and the logic flow ends 1113.

FIG. 12 illustrate a logic flow diagram 1200 of steps executed by a display-based terminal to dynamically group and ungroup communication units in accordance with yet another embodiment of the present invention. FIG. 12 shows an example of utilizing criteria to exclude communication units from being grouped into a talkgroup. The logic flow begins 1201 when the terminal displays 1203 a map to the terminal user indicating locations of communication units in at least a portion of the communication system. Some time after the map is displayed, the terminal receives 1205, 1207 and preferably stores in memory an indication of one or more geographic regions on the map and an identification of at least one target talkgroup. Indication of the geographic region or regions and identification of the target talkgroup or talkgroups may be made using in any one or more of the various techniques described above.

In addition to receiving the indication of at least one region on the map and at least one talkgroup, the terminal receives 1209 and preferably stores in memory criteria from the user for excluding communication units from being grouped into the target talkgroup. That is, the user preferably specifies the individual identifications, talkgroup identifications, and/or statuses of the communication units that are not to be grouped into the target talkgroup upon their entry into the indicated geographic region.

After receiving the geographic region indication, talkgroup identification, and talkgroup exclusion criteria, the terminal determines 1211 whether a communication unit has entered the indicated geographic region. If a communication unit being monitored by the terminal user has entered the indicated region, the terminal stores 1213 the talkgroup identification (ID) of the communication unit's current talkgroup in memory and determines 1215 whether the communication unit meets the talkgroup exclusion criteria. If the communication unit meets the criteria, the terminal does not group 1217 the communication unit into the target talkgroup. If, however, the communication unit does not meet the criteria, the terminal automatically groups 1219 the communication unit into the target talkgroup.

Some time after a communication unit has been grouped into the target talkgroup based on its entry into the indicated region and failure to meet the talkgroup exclusion criteria, the terminal determines 1221 whether the communication unit has exited the indicated region. If the communication unit has exited the indicated region, the terminal automatically removes 1223 the communication unit from the target talkgroup and groups the communication unit back into its original talkgroup (i.e., the talkgroup whose identification was stored in memory at block 1213), and the logic flow ends 1225.

The present invention encompasses a method and apparatus for dynamically grouping communication units in a communication system. With this invention, a user of a display-based terminal, such as a CAD terminal, having an integrated mapping program can dynamically regroup communication units directly from the map display, without having to leave the map display to access and run other regrouping programs, thereby providing integrated dispatch functionality. That is, with the present invention, once the terminal user selects or inputs within the map environment the communication units to be regrouped or indicates a regrouping area, a temporary talkgroup identification, and optionally group/ungroup filter criteria, the terminal, through execution of software routines stored in memory, automatically regroups the affected communication units without requiring the terminal user to ever leave the map environment. The present invention provides the terminal user with substantial flexibility in performing the regrouping by providing the user with several options for selecting communication units to be regrouped. All such selection options are preferably accessible directly from the map display to enable the terminal user to monitor the progress of an incident while, at the same time, regrouping communication units that are attending to the incident to enable the attending units to engage in direct group communications. Prior art dynamic regrouping techniques do not provide for such map-based regrouping of communication units.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method for a display-based terminal to dynamically group communication units in a dispatch communication system, the method comprising the steps of:

displaying a map to a user of the display-based terminal indicating locations of a plurality of communication units;

receiving, from the user, a selection from the map of at least one communication unit of the plurality of communication units to produce at least one selected communication unit;

receiving, from the user, an identification of at least one talkgroup with which the at least one selected communication unit is to become a member; and automatically grouping the at least one selected communication unit into the at least one talkgroup.

2. The method of claim 1, wherein the step of receiving an identification of at least one talkgroup comprises the step of receiving a sequence of keystrokes that identify the at least one talkgroup.

3. The method of claim 1, wherein the step of receiving an identification of at least one talkgroup comprises the steps of:
displaying a list of talkgroup identifications to the user; and
receiving, from the user, a selection of at least one talkgroup identification from the list of talkgroup identifications.

4. The method of claim 3, wherein the step of receiving an identification of at least one talkgroup further comprises the steps of:
receiving, from the user, a request for the list of talkgroup identifications; and
retrieving the list of talkgroup identifications from memory responsive to the request.

5. The method of claim 1, wherein the step of receiving a selection from the map comprises the steps of:
receiving, from the user, a selection of a geographic area on the map; and
automatically selecting each communication unit located in the geographic area to produce the at least one selected communication unit.

6. The method of claim 1, further comprising the steps of:
receiving, from the user, a selection from the map of the at least one selected communication unit; and
automatically removing the at least one selected communication unit from the at least one talkgroup, such that the at least one selected communication unit rejoins a talkgroup that included the at least one communication unit prior to selection of the at least one communication unit.

7. The method of claim 1, wherein the step of automatically grouping comprises the steps of:
accessing a communication resource; and
sending a command to the at least one selected communication unit over the communication resource, the command including grouping information related to the at least one talkgroup and instructing the at least one selected communication unit to reconfigure based on the grouping information.

8. The method of claim 7, wherein the grouping information includes at least one of the identification of the at least one talkgroup and an encryption key.

9. A method for a display-based terminal to dynamically ungroup communication units in a dispatch communication system, the method comprising the steps of:
displaying a map to a user of the display-based terminal indicating locations of a plurality of communication units;
receiving, from the user, a selection from the map of at least one communication unit of the plurality of communication units to produce at least one selected communication unit;
receiving, from the user, an identification of at least one talkgroup of which the at least one selected communication unit is presently a member; and
automatically removing the at least one selected communication unit from the at least one talkgroup.

10. The method of claim 9, wherein the step of receiving an identification of at least one talkgroup comprises the step of receiving a sequence of keystrokes that identify the at least one talkgroup.

11. The method of claim 9, wherein the step of receiving an identification of at least one talkgroup comprises the steps of:
displaying a list of talkgroup identifications to the user; and
receiving, from the user, a selection of at least one talkgroup identification from the list of talkgroup identifications.

12. The method of claim 11, wherein the step of receiving an identification of at least one talkgroup further comprises the steps of:
receiving, from the user, a request for the list of talkgroup identifications; and
retrieving the list of talkgroup identifications from memory responsive to the request.

13. The method of claim 9, wherein the step of receiving a selection from the map comprises the steps of:
receiving, from the user, a selection of a geographic area on the map; and
automatically selecting each communication unit located in the geographic area to produce the at least one selected communication unit.

14. The method of claim 9, wherein the step of automatically removing comprises the steps of:
accessing a communication resource; and
sending an ungroup command to the at least one selected communication unit over the communication resource, the ungroup command including the identification of the at least one talkgroup.

15. A method comprising the steps of:
displaying a map of a geographic area on a display-based terminal, wherein the map contains a plurality of communication units in their associated locations within the geographic area;
accepting, by the display-based terminal, a selection, from the user of the display-based terminal, of least one communication unit of the plurality of communication units from the displayed map;
accepting, from the user, a talkgroup identification of a talkgroup; and
grouping the selected at least one communication unit into the talkgroup.

16. The method of claim 15, wherein the talkgroup identification is typed into the display-based terminal by the user.

17. The method of claim 15, wherein the talkgroup identification is chosen, by the user, from a list displayed on the display-based terminal.

18. The method of claim 15, further comprising the steps of:
accepting a request from the user for a list of talkgroup identifications;
obtaining the list of talkgroup identifications from a database; and
displaying the list of talkgroup identifications on the display-based terminal.

19. The method of claim 15, further comprising the steps of:
receiving, from the user, an indication from the map of at least one communication unit of the plurality of communication units to produce at least one indicated communication unit;

receiving, from the user, an identification of at least one talkgroup of which the at least one indicated communication unit is presently a member; and automatically removing the at least one indicated communication unit from the at least one talkgroup.

20. A method comprising the steps of:

displaying a map of a geographic area on a display-based terminal, wherein the map contains a plurality of communication units in their associated locations within the geographic area;

accepting, by the display-based terminal, a selection, from the user of the display-based terminal, of least one communication unit of the plurality of communication units from the displayed map;

accepting, from the user, at least one talkgroup identification of at least one talkgroup of which the selected at least one communication unit is a member; and removing the selected at least one communication unit from the talkgroup.

21. The method of claim 20, wherein the at least one talkgroup identification is typed into the display-based terminal by the user.

22. The method of claim 20, wherein the at least one talkgroup identification is chosen, by the user, from a list displayed on the display-based terminal.

23. The method of claim 20, further comprising the steps of:

accepting a request from the user for a list of talkgroup identifications in which the selected at least one communication unit is a member of at least one talkgroup identified in the list of talkgroup identifications;

obtaining the list of talkgroup identifications from a database; and displaying the list of talkgroup identifications on the display-based terminal.

24. The method of claim 20, further comprising the steps of:

receiving, from the user, an indication from the map of at least one communication unit of the plurality of communication units to produce at least one indicated communication unit;

receiving, from the user, an identification of at least one talkgroup of which the at least one indicated communication unit is presently a member; and automatically removing the at least one indicated communication unit from the at least one talkgroup.

25. A display-based terminal comprising:

a graphical user interface arranged and constructed to display, to a user of the display-based terminal, a map indicating locations of a plurality of wireless communication units;

a selection device for use by the user of the display-based terminal to select from the map at least one wireless communication unit of the plurality of wireless communication units to produce at least one selected communication unit and to identify at least one talkgroup with which the at least one selected communication unit is to become a member; and a processor coupled to the graphical user interface and the selection device, the processor, responsive to the selection device, arranged and constructed to automatically group the at least one selected communication unit into the at least one talkgroup.

26. The display-based terminal of claim 25, further comprising a memory device, coupled to the graphical user interface and the processor, arranged and constructed to store therein a list of talkgroup identifications and, responsive to the processor, to provide the list of talk group identifications to the graphical user interface to enable the user to identify the at least one talkgroup from the list.

27. The display-based terminal of claim 25, wherein the selection device comprises at least one of a computer mouse, a keyboard, a touchscreen portion of the graphical user interface, and a voice recognition device.

28. The display-based terminal of claim 25, wherein the display-based terminal is part of a dispatch communication system that includes a wireless infrastructure, wherein the display-based terminal is located remotely from the wireless infrastructure, and wherein the display-based terminal further comprises a radio transceiver, coupled to the processor, for exchanging information with the wireless infrastructure.

29. A display-based terminal comprising:

a graphical user interface that displays, to a user of the display-based terminal, a map indicating locations of a plurality of wireless communication units;

a selection device for use by the user of the display-based terminal to select from the map at least one wireless communication unit of the plurality of wireless communication units to produce at least one selected communication unit and to identify at least one talkgroup of which the at least one selected communication unit is presently a member; and a processor coupled to the graphical user interface and the selection device, the processor, responsive to the selection device, automatically removing the at least one selected communication unit from the at least one talkgroup.

30. The display-based terminal of claim 29, further comprising a memory device, coupled to the graphical user interface and the processor, arranged and constructed to store therein a list of talkgroup identifications and, responsive to the processor, to provide the list of talkgroup identifications to the graphical user interface to enable the user to identify the at least one talkgroup from the list.

31. The display-based terminal of claim 29, wherein the user input device comprises at least one of a computer mouse, a keyboard, a touchscreen portion of the graphical user interface, and a voice recognition device.

* * * * *